US006767728B2

(12) United States Patent
Yang et al.

(10) Patent No.: US 6,767,728 B2
(45) Date of Patent: Jul. 27, 2004

(54) COMPOSITION FOR ENZYMATIC DEINKING OF WASTE PAPER

(75) Inventors: Jan L. Yang, Watkinsville, GA (US); Jiahua Ma, Athens, GA (US); J. Michael Pierce, Athens, GA (US); Karl-Erik L Eriksson, Athens, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 199 days.

(21) Appl. No.: 10/012,926

(22) Filed: Oct. 22, 2001

(65) Prior Publication Data

US 2002/0142452 A1 Oct. 3, 2002

Related U.S. Application Data

(62) Division of application No. 09/366,683, filed on Aug. 4, 1999, now Pat. No. 6,426,200, which is a continuation of application No. 08/837,437, filed on Apr. 17, 1997, now abandoned, which is a division of application No. 08/308,666, filed on Sep. 19, 1994, now Pat. No. 5,454,389.

(51) Int. Cl.$^7$ ................................................. C12P 19/00

(52) U.S. Cl. ......................... 435/207; 435/18; 435/72; 435/209; 435/277; 435/278

(58) Field of Search ................................ 435/207, 209, 435/277, 278

(56) References Cited

U.S. PATENT DOCUMENTS

| | | | |
|---|---|---|---|
| 4,472,504 A | | 9/1984 | Gallo .......................... 435/209 |
| 5,110,412 A | | 5/1992 | Fuentes et al. ................. 162/5 |
| 5,298,405 A | | 3/1994 | Nevalainen et al. ......... 435/209 |
| 5,364,501 A | | 11/1994 | Baret et al. ..................... 162/5 |
| 5,525,193 A | | 6/1996 | Franks et al. ................... 162/5 |
| 5,785,809 A | | 7/1998 | Ow et al. ....................... 162/5 |
| 5,837,515 A | | 11/1998 | Suominen et al. .......... 435/200 |
| 6,241,849 B1 | * | 6/2001 | Franks ........................... 162/5 |
| 6,426,200 B1 | * | 7/2002 | Yang et al. .................... 435/72 |
| 6,558,728 B1 | * | 5/2003 | Poulsen et al. .............. 426/549 |

FOREIGN PATENT DOCUMENTS

| | | |
|---|---|---|
| CA | 758488 | 5/1967 |
| CA | 2032256 | 12/1990 |
| GB | 2 231 595 B | 3/1993 |
| JP | 59 09 299 | 7/1982 |
| JP | A 59-9299 | 1/1984 |
| JP | 2-80683 | 4/1984 |
| JP | Sho 63-15494 | 3/1988 |
| JP | 61-197277 | 3/1988 |
| JP | 90 80 683 | 8/1988 |
| JP | 90160984 | 12/1988 |
| JP | 91 249291 | 11/1991 |
| WO | WO 91/14819 | 3/1991 |

OTHER PUBLICATIONS

Jefferies, T. Comparison of Enzyme Enhanced With Conventional Deinking of Xerographic and Laser Printed Paper. 1994 Tappi J 77(4)173–179.*
Anon (1993) "Recycle Paper Chemistry: Changes, Choices" *PIMA* Magazine, Jun. 1993, 75(6): pp. 45, 46, 48, 50, 52.
Jeffries, T.W. et al. (1992) "Enzymatic Solutions to Enhance Bonding, Bleaching and Contaminant Removal" *Mat. Res. Soc. Symp. Proc.* paper, 266:277–287.
Jeffries, T.W. et al. (1993) "Preliminary Results of Enzyme–Enhanced Versus Conventional Deinking of Xerographic Printed Paper" TAPPI 1993 Recycling Symposium Notes, TAPPI Press, Atlanta, GA, p. 183.
Jeffries, T.W. et al. (1994) "Comparison of Enzyme–Enhanced with Conventional Deinking of Xerographic and Laser–Printed Paper" *TAPPI J.* 77(4):173–179.
Kim, T.J. et al. (1991) "Enzymatic Deinking Method of Wastepaper" *TAPPI Pulp. Conf. Proc.*, TAPPI Press, Atlanta, GA, pp. 1023–1027.
Okada, E. (1991) "Deinking of Toner Printed Paper" *1991 Pulp. Conf. Proc.*, TAPPA Press, Atlanta, GA, pp. 857–864.
Ow, S.K. and Eom, T.J.(1990) "Biological Deinking Method of Newsprint Wastepaper" *Proc. EUPECA Symp.*, Barcelona 37:85–94.
Prasad, D.Y. (1993) "Enzymatic Deinking of Laser and Xerographic Office Wastes" *Appita* 46(4):289–292.
Prasad, D.Y. et al. (1993) "Enzymatic Deinking of Colored Offset Newsprint" Nord, *Pulp Pap. Res. J.* 8(2):284–286.
Prasad, D.Y. et al. (1992) "Enzymatic Deinking of Black and White Letterpress Printed Newsprint Waste" *Prog. Pap. Recycling* 1(8):21–30.
Shrinath, A. et al. (1991) "A Review of Ink–Removal Techniques in Current Deinking Technology" *TAPPI J.* pp. 85–93.
Vidotti, R.M. et al. (1992) "Comparison of Bench Scale and Pilot Plant Flotation of Photocopied Office Waste Paper" *1992 Pulp. Conf. Proc.*, TAPPI Press, Atlanta, GA, pp. 643–652.
Zeyer, C. et al. (1993) "Enzymatic Deinking of Cellulose Fabric: A Model Study for Enzymatic Paper Deinking" *Progress in Paper Recyling* pp. 36–44.
Biomass, "Methods in Enzymology" vol. 160 Academic Press NY (1988) pp. 94–97.

* cited by examiner

*Primary Examiner*—Ralph Gitomer
(74) *Attorney, Agent, or Firm*—Greenlee, Winner and Sullivan, PC

(57) ABSTRACT

A method and composition for deinking noncontact-printed wastepaper, particularly xerographic and laser-printed paper, and mixtures of contact and noncontact-printed wastepaper, using an enzyme mixture characterized by a high ratio of β-glucosidase activity to filter paper units (FPU) activity. The present invention also relates to an assay for evaluating enzymes for use in deinking wastepaper based on the ratio of β-glucosidase activity to FPU activity.

14 Claims, 11 Drawing Sheets

COMPOSITION FOR ENZYMATIC DEINKING OF WASTE PAPER

This application is a division of U.S. Application No. 09/366,683 filed Aug. 4, 1999, now U.S. Pat. No. 6,426,200, which is a continuation of U.S. Application No. 08/837,437 filed Apr. 17, 1997, now abandoned, which is a divisional of U.S. Application No. 08/308,666 filed Sep. 19, 1994, now U.S. Pat. No. 5,454,389.

FIELD OF THE INVENTION

This invention pertains to a method and composition for deinking printed wastepaper. More particularly, this invention relates to a method and composition for deinking noncontact-printed wastepaper, particularly xerographic and laser-printed paper, and mixtures of contact and noncontact-printed wastepaper, using an enzyme mixture characterized by a high ratio of β-glucosidase activity to filter paper units (FPU) activity. The present invention also relates to an assay for evaluating enzymes for use in deinking wastepaper based on the ratio of β-glucosidase activity to FPU activity.

BACKGROUND OF THE INVENTION

Recycling of waste papers and paper products has generated considerable interest in the pulp and paper industry. In response to increasing environmental awareness and regulatory pressure, the paper industry expects to recover and recycle at least 40% of all paper produced in the U.S. by 1995. Proposed regulations require even higher recoveries of certain grades of paper. (Darlington, W. E. (1992) Tappi 1992 Pulp. Conf. Proc., p. 857.) As the demand for recycled fiber content in paper products grows, the need for improved fiber deinking technologies increases accordingly.

Conventional deinking processes require large amounts of expensive, environmentally hazardous chemicals. Current recycling protocols use caustic soda and other chemicals throughout the recycling process. Because these chemicals tend to discolor the pulp, peroxide is typically added to whiten the pulp to the required brightness. These chemicals are eventually washed away in the waste water, causing serious environmental problems. In addition to their high cost and environmental impact, deinking chemicals disintegrate the paper fibers, resulting in lower quality pulp with poor physical properties.

As an alternative to conventional chemical deinking, enzymatic deinking of wastepaper has received increasing attention during the last few years. Several studies have shown that enzymes such as cellulases, hemicellulases, xylanases and lipases effectively deink "contact" printed wastepaper, i.e., papers produced by traditional offset printing using oil-based inks. For example, cellulases have been used to deink old newspaper when used alone or in combination with conventional deinking chemicals. (Fukunaga, N., et al. (Jap. Pat. 0280683); Kao Corp. (Jap. Pat. 59 09,299); Eom, T. J., et al. (1991) Kami Pa Gikyoshi 45(12):1377–82; and Prasad, D. Y., et al. (1992) Prog. Pap. Recycling 1(8):21.) Ow, S. K. and Eom, T. J. (1990) Proc. EUPECA Symp., Barcelona 37:85–94, reports that newspaper can be deinked without conventional deinking chemicals using a cellulase and hemicellulase-containing culture filtrate. Baret, J. L., et al. (PCT Int. Appl. WO 91/14819) reports efficient deinking of wastepaper comprising old newspapers, colored wood-free shavings and magazines using alkaline cellulase together with conventional deinking chemicals. Neo, P., et al. (1986) J. Wood Chem. Tech. 6(2):147, reports that xylanases promote "enzyme beating" during conventional chemical deinking. Finally, incorporation of an alkaline lipase in the conventional alkaline deinking process reportedly improves the brightness and fiber quality of the deinked pulp. (Sugi, T. and Nakamura, J. (Jap. Pat. 03,249,291); and Sharyo, M. and Sakaguchi, H. (Jap. Pat. 02,160,984)).

While the enzymatic deinking of "contact" printed wastepaper has been achieved, relatively little effort has been devoted to the development of alternative methods for deinking "noncontact" printed papers, the principal component of "mixed office waste." Noncontact-printed papers, including xerographic and laser-printed papers, are notoriously difficult to deink by conventional deinking methods. (Vidotti, R. M., et al. (1992) "Comparison of Bench Scale and Pilot Plant Flotation of Photocopied Office Waste Paper," 1992 Pulp. Conf. Proc., TAPPI Press, Atlanta, Ga., p. 643–652.) The noncontact inks (toners) used in xerographic and laser printing consist of colored pigments combined with a thermoplastic resin binder, the latter component comprising synthetic polymers such as polyester, styrene-butyl methacrylate or styrene-butadiene copolymers. (Vidotti et al., supra, p. 643.) The polymers become fused together and permanently affixed to the paper during the "fixing" stage of the printing process. During repulping, these fused polymers dissolve into thin, flat particles varying in size from a few to several hundred or more microns in diameter. (Vidotti et al., supra.) Because of this broad range of ink particle sizes, dislodged toner particles are not readily separated from the paper fibers. The larger ink particles, ranging in size from about 100 to about 300 μm in diameter, are too massive to be removed using conventional washing or flotation techniques, yet too small to be screened with existing devices. Moreover, their flat, disk-like configuration prevents toner particles from being separated by conventional centrifugal cleaning. Alteration of the size and shape of these dislodged toner particles requires harsh chemical and/or mechanical treatments such as high shear mixing or kneading. (Okada, E. (1991) 1991 Pulp. Conf. Proc., TAPPI Press, Atlanta, Ga., p. 857–864.) However, such actions are not specific, decrease fiber length, and create excessive fines and debris, resulting in reduced fiber strength. Finding efficient, cost effective and innocuous means for deinking toners from xerographic and laser-printed paper represents perhaps the greatest challenge for the pulp and paper industry.

Jeffries, T. W., et al. (1993) Tappi 1993 Recycling Symposium Notes, TAPPI Press, Atlanta, Ga., p. 183, discloses the use of a commercial cellulase to deink homogenous xerographic-printed wastepaper produced from a defined styrene/acrylate toner stock. Jeffries et al. compare the deinking capacity of cellulase (Celluclast™, Novo Nordisk Bioindustrials, Inc., Danbury, Conn.) with standard deinking chemicals using identical steps of high-consistency pulping. The authors report that this particular cellulase used alone was more efficient than chemicals alone or enzymes used in combination with chemical deinking. However, Jeffries et al. note that additional studies are necessary to evaluate the efficiency of enzymatic treatment on heterogenous office wastepaper which contain a mixture of hard-to-remove noncontact toners.

Jeffries, T. W., et al. (1994) Tappi J. 77(4):173–179, compare the deinking efficiency of several commercial cellulases in pilot plant trials. Although the authors could not attribute toner removal to a specific enzymatic activity, they report that "enzymes with the highest FPU values performed best for deinking" whereas the enzyme with the highest cellulase activity (Enzyme C) was among the "least effective in removing toner" (p. 177). Jeffries et al. further note that efficiency of enzymatic deinking depends on the particular paper source, i.e., whether the paper was acid- or alkaline-sized. This reference thus suggests that the cellulase be selected based on the pH range of the pulped paper stock, and that a high filter paper units (FPU) value may be more important to the efficiency of deinking than cellulase activity per se.

Kim, T. J., et al. (1991) Tappi 1991 Pulp. Conf. Proc., TAPPI Press, Atlanta, Ga., p. 1023–27, purport to provide an enzymatic method for deinking laser-printed computer printout (CPO) paper. [See also Eom, T. J., et al. (Can. Pat. App. 2,032,256).] Kim et al. report a slight improvement in fiber physical properties and a reduction in dirt count by substituting a cellulase for caustic soda during pulping. Although this preliminary report suggests the use of this enzyme to deink laser-printed white ledger paper, the reference provides no evidence that this cellulase (or any other enzyme) could effectively deink heterogenous office wastepaper, i.e., mixed grades and/or colored papers. The reference does not associate deinking with any specific enzyme activity, nor does it provide a basis for evaluating or identifying enzymes for use with a variety of noncontact toners.

Despite the growing pressure to recycle all grades of papers, relatively little attention has been given to the development of methods for recycling difficult-to-deink xerographic and laser-printed papers, the principal component of mixed office waste. Although preliminary reports suggest that noncontact-printed papers can be deinked using enzymes, none teach enzyme preparations optimized specifically for this type of wastepaper. None of the known methods provides a means for removing mixtures of toner inks from various paper sources.

Thus, a need exists for a reliable, versatile and efficient method for deinking all types of wastepaper, especially mixed office wastepaper comprising a blend of hard to deink toners. There is also a need in the art for an enzyme formulation optimized specifically for deinking noncontact printed paper, but which has general applicability to all types of wastepaper. Finally, a need exists for a simple and definitive assay for evaluating the efficiency of enzyme preparations suitable for all types of wastepaper, including heterogenous office wastepaper.

SUMMARY OF THE INVENTION

The present invention provides a practical and efficient process for deinking printed wastepaper. This method is effective in deinking all types of wastepaper, including the difficult-to-deink noncontact-printed papers such as xerographic and laser-printed papers, and mixtures of contact and noncontact-printed wastepaper. The present invention is based on the discovery that mixtures of enzymes having a high ratio of β-glucosidase activity to filter paper units (FPU) activity provide surprisingly improved efficiency of deinking. Also surprisingly, surfactant and cations such as calcium ion facilitate flotation when maintained within defined concentration ranges. The methods disclosed herein are surprisingly more efficient than prior art methods and result in higher quality pulp with improved physical properties, higher brightness, better cleanliness (less residual ink content) and improved freeness.

The subject method for deinking toner from wastepaper comprises the steps of pulping the wastepaper to produce a pulp slurry, adjusting the pH to between about 4 and 6 (or, alternatively, to between about 6 and 8), adding suitable deinking enzymes wherein said enzymes are characterized by a high ratio of β-glucosidase activity to FPU activity, continuing the pulping for at least 10 minutes, and separating the toner particles from the pulp.

Another object of this invention is to provide a method for deinking printed wastepaper, including noncontact-printed paper such as xerographic and laser-printed paper, and mixtures of noncontact and contact printed wastepaper such as xerographic, laser-printed paper, newsprint and magazine papers, using a deinking formulation comprising preselected enzymes. This deinking formulation promotes desirable fiber surface modifications, thus providing high quality deinked pulp. The deinking formulation also reduces the size and alters the shape of released ink particles, thus providing significantly improved flotation efficiency.

Yet another object of the present invention is to provide a composition for deinking noncontact-printed paper, and mixtures of noncontact- and contact-printed papers, containing deinking enzymes as the active ingredient, wherein the enzymes are characterized by a high ratio of β-glucosidase activity to FPU activity. The composition promotes desirable fiber surface modifications, reduces and optimizes toner particle size and affects the shape of released toner particles, thus providing high quality deinked pulp. Preferred deinking formulations of the present invention also comprise optimum concentrations of cations and surfactant, thus providing significantly improved flotation efficiency. Compositions further comprising metal ion chelating agents are of particular interest.

The present invention also provides a simple and definitive assay for evaluating the efficiency of enzymes for deinking wastepaper. This method for selecting suitable deinking enzymes comprises the steps of determining the β-glucosidase activity and FPU activity of said enzymes, and calculating the ratio of β-glucosidase activity to FPU activity. Enzymes having a high ratio of β-glucosidase activity to FPU activity have been found to provide surprisingly improved efficiency of deinking. Also surprisingly, an inverse relationship exists between the β-glucosidase:FPU ratio and the enzyme concentration required for effective deinking; the higher the ratio, the lower the required enzyme concentration. Enzymes with β-glucosidase:FPU ratios of at least 100:1 are preferred. However, enzymes with β-glucosidase:FPU ratios of less than 100:1 give satisfactory results when used at higher concentrations.

The present invention thus provides a practical and efficient means for deinking all types of printed wastepaper, including the difficult-to-deink noncontact-printed papers such as xerographic and laser-printed papers. Enzymatic deinking compositions of the present invention, by virtue of their high β-glucosidase:FPU ratios and optimum cation and surfactant concentrations, offer improved efficiency and wider applicability than prior art compositions. Specifically, deinking compositions of the present invention produce smaller, finer ink particles, thus providing surprisingly cleaner deinked pulp. Deinking compositions characterized by a high β-glucosidase:FPU activity ratio are effective with all types of wastepaper, regardless of ink type or paper source, thus eliminating the uncertainty and restrictions of prior art methods. Finally, the present invention provides a simple and definitive means for assessing the efficiency of potential deinking enzymes, thus eliminating the need for actual pulping trials strictly to evaluate efficacy.

Other objects, features and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description. All the percentage units used in the document are calculated on a weight/weight basis unless otherwise specified in the text.

BRIEF DESCRIPTION OF THE FIGURES

FIG. 7a illustrates ink particles before the enzyme treatment;

FIG. 7b illustrates ink particles after the enzyme treatment followed by flotation.

FIG. 12 illustrates the effect of surfactant concentration (Tween 80) on the Tappi dirt area of deinked pulps.

DETAILED DESCRIPTION OF THE PREFERRED EMBODIMENTS

Figure 1:
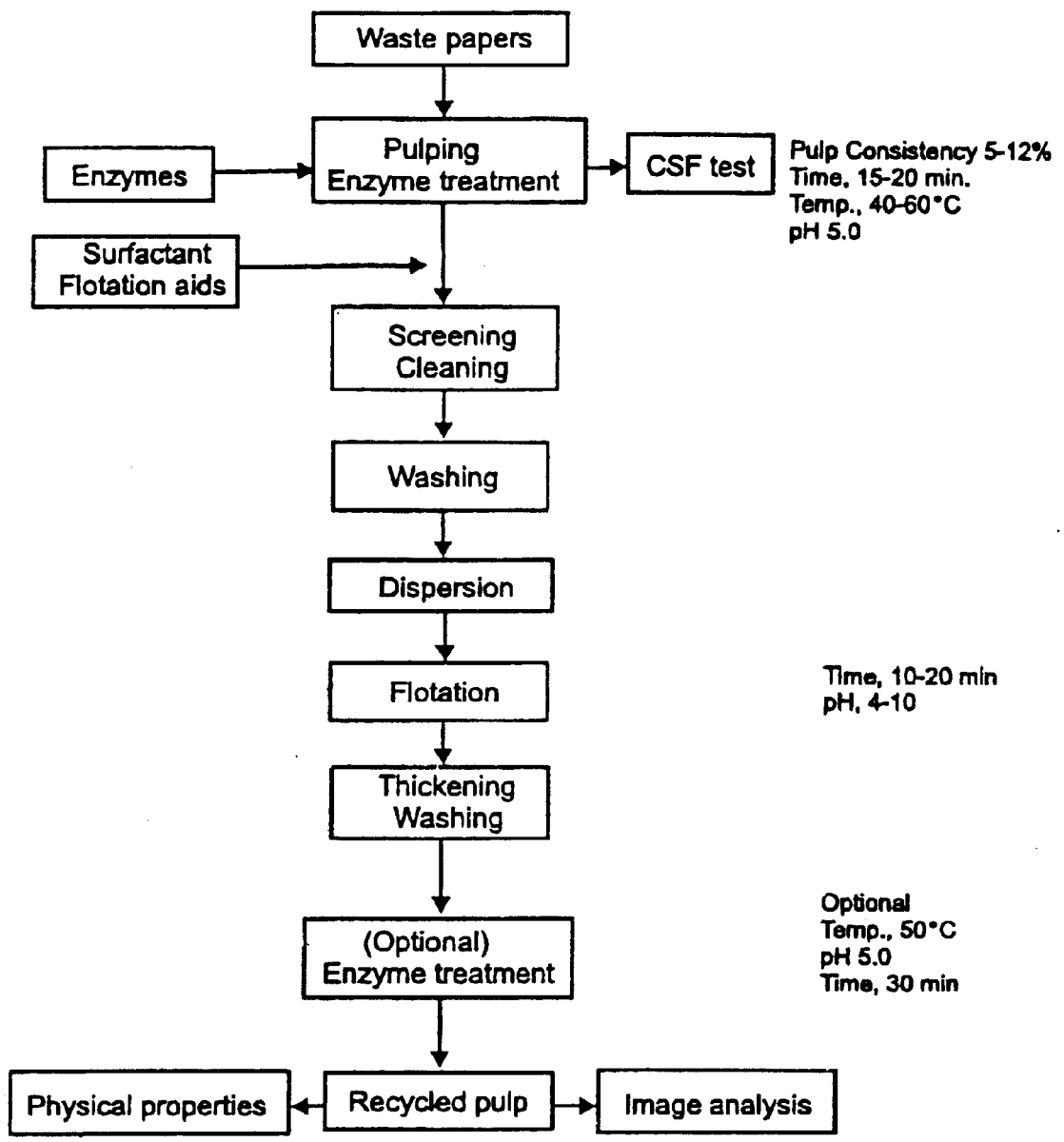
FIG. 1 is a flow diagram of the enzymatic deinking process.

The subject invention provides an enzymatic method for deinking printed wastepaper. The invention is based on the discovery that enzymes having a high ratio of β-glucosidase activity to filter paper units (FPU) activity provide surprisingly improved efficiency of deinking. The subject method for deinking toner from wastepaper comprises the steps of pulping the wastepaper to produce a pulp slurry, adjusting the pH to between about 4 and about 6 (or, alternatively, to between about 6 and about 8), adding suitable deinking enzymes wherein said enzymes are characterized by a high ratio of β-glucosidase activity to FPU activity, adding surfactant and cations, continuing the pulping for at least 10 minutes, terminating the activity of the deinking enzymes, and separating the toner particles from the pulp.

As used herein, "deinking enzymes" are enzymes capable of removing noncontact ink (toner) from printed wastepaper. The term "deinking enzymes" encompasses purified or partially purified enzyme preparations including synthetic or naturally occurring cellulases and hemicellulases displaying β-glucosidase and filter paper units activities and also possibly including exo-glucanase, xylanase and other enzymic activities. Deinking enzymes include microbial cellulases from a variety of fungal and bacterial sources including, without limitation, *Aspergillus niger*, *Trichoderma reesei*, *Trichoderma viride*, *Penicillium funiculosum*, *Clostridium thermocellum* and *Bacillus subtilis*.

As used herein, "enzymatic deinking formulation," "enzymatic deinking composition" and "enzyme composition" refer to compositions for deinking wastepaper comprising deinking enzymes as the active ingredient, wherein the enzymes are characterized by a ratio of β-glucosidase activity to FPU activity of at least about 30:1, preferably by a high ratio of β-glucosidase activity to FPU activity of at least 100:1. Preferred "deinking formulations" and "enzymatic deinking compositions" of the present invention also comprise optimum concentrations of cations and surfactant, thus providing significantly improved deinking flotation efficiency.

"Noncontact ink," "toner ink" and "toner" generally refer to the synthetic inks used in noncontact printing and copying such as those typically used in xerographic and laser printing. "Noncontact" or "toner" inks comprise colored pigments and synthetic polymers such as polyester, styrene-butyl methacrylate or styrene-butadiene copolymers. "Noncontact-printed paper," "toner-printed paper," "noncontact-printed wastepaper" and "toner-printed wastepaper" refer to paper produced by printing or copying with these noncontact-type inks. "Mixed office wastepaper" refers to the general category of wastepaper comprising various grades of paper, particularly noncontact-printed paper such as xerographic and laser-printed paper.

"Toner particles" refer to the ink particles released during repulping of noncontact-printed paper. The toner particles produced in accordance with the present invention are generally smaller in diameter and more spherical than toner particles produced by prior art methods, thus providing significantly improved flotation efficiency.

As used herein, a "high ratio" of β-glucosidase activity to filter paper units (FPU) activity means a ratio of β-glucosidase activity to FPU activity of at least 100:1, wherein both enzymic activities are measured in international units per ml. Enzymes having a high ratio of β-glucosidase activity to FPU activity have been found to provide surprisingly improved efficiency of deinking. Also surprisingly, an inverse relationship exists between the β-glucosidase:FPU ratio and the enzyme concentration required for effective deinking; i.e., the higher the ratio, the lower the required enzyme concentration. Thus, enzymes with β-glucosidase:FPU ratios of less than 100:1 provide satisfactory results when used at relatively higher concentrations.

Enzymatic deinking in accordance with the present invention is effective with all types of printed wastepaper, including the difficult-to-deink noncontact-printed papers such as xerographic and laser-printed papers. The deinking methods and compositions of the present invention are also effective with contact-printed papers using traditional oil-based offset printing methods, such as old newspapers, old magazines, old corrugated containers and computer printout paper.

While the mechanism of enzymatic deinking is not fully understood, and not wishing to be bound by any specific theory, it is believed that the deinking enzymes of the present invention prefer amorphous cellulose fiber surfaces as compared to crystalline cellulose surfaces. The deinking enzymes of the invention also show high affinity for fines and debris. Because of this specificity toward amorphous cellulose, the extent of fiber surface modifications can be controlled to minimize undesirable mechanical and chemical actions on the fibers, thus maintaining high fiber quality. Based on the observed improvement in fiber physical properties, it is believed that deinking enzymes also generate free functional groups (e.g., hydroxyl and carboxyl groups) on fiber surfaces. These functional groups participate in interfiber bonding, thereby enhancing the water retention value and Canadian Standard Freeness (CSF) of the deinked pulp. The deinking compositions of the invention also provide an optimal size distribution of released toner particles, thus improving efficiency of subsequent washing, flotation and cleaning operations.

As briefly noted above, enzymatic deinking according to the present invention is achieved by pulping toner-printed wastepaper with suitable deinking enzymes, then separating the toner particles from the pulp. In general, the process comprises the following steps:

(a) pulping the wastepaper to produce a pulp slurry;

(b) adjusting the pH of said pulp slurry;

(c) adding deinking enzymes to said pulp slurry, wherein said deinking enzymes have a β-glucosidase activity to filter paper units activity ratio of at least 30:1;

(d) adding surfactant and cations;

(e) continuing pulping for at least 10 minutes to produce a treated pulp slurry comprising toner particles and pulp;

(f) deactivating said deinking enzymes; and (g) separating the toner particles from the pulp.

Specifically, at the outset of the process, the deinking enzymes are evaluated for efficiency based on the ratio of β-glucosidase activity to filter paper units activity, as discussed more fully below. The present invention is operable with enzyme mixtures having the following approximate β-glucosidase:FPU ratios, in increasing order of preference: 30–39, 40–49, 50–59, 60–69, 70–79, 80–89, 90–99 and 100+. Enzymes with β-glucosidase:FPU ratios of at least 100:1 are most preferred.

The step of pulping the wastepaper to produce a pulp slurry is carried out using a pulper, for example using a conventional pulper equipped with a Helico rotor or a pulper designed to perform both pulping and flotation. This initial pulping step continues until the pulp consistency is between about 5 and 15 percent, more preferably between about 8 and 12 percent, and most preferably about 10 percent.

After achieving the desired pulp consistency, the pH of the pulp slurry is adjusted to between about 4 and 6, more preferably between about 4.8 and about 5.3. The pH adjustment is accomplished using a standard acidifying agent including, but not limited to, sulfuric acid, nitric acid, acetic acid, hydrochloric acid, chloric acid, citric acid or other organic acids. As shown in Table 3, optimal fungal cellulase activity occurs around pH 5.0.

In an alternate preferred embodiment, enzymatic deinking is carried out at a neutral pH. After achieving the desired pulp consistency, the pH is adjusted, if necessary, to between about 6 and about 8, more preferably between about 6.5 and about 7.5. Enzyme preparations should be assayed at this pH to identify the optimal preparation for this pH range. As shown in Example 3, bacterial cellulases such as Novo-Neutral™ (Novo Nordisk Bioindustrials, Inc., Danbury, Conn.) are particularly effective in this pH range.

Figure 10:
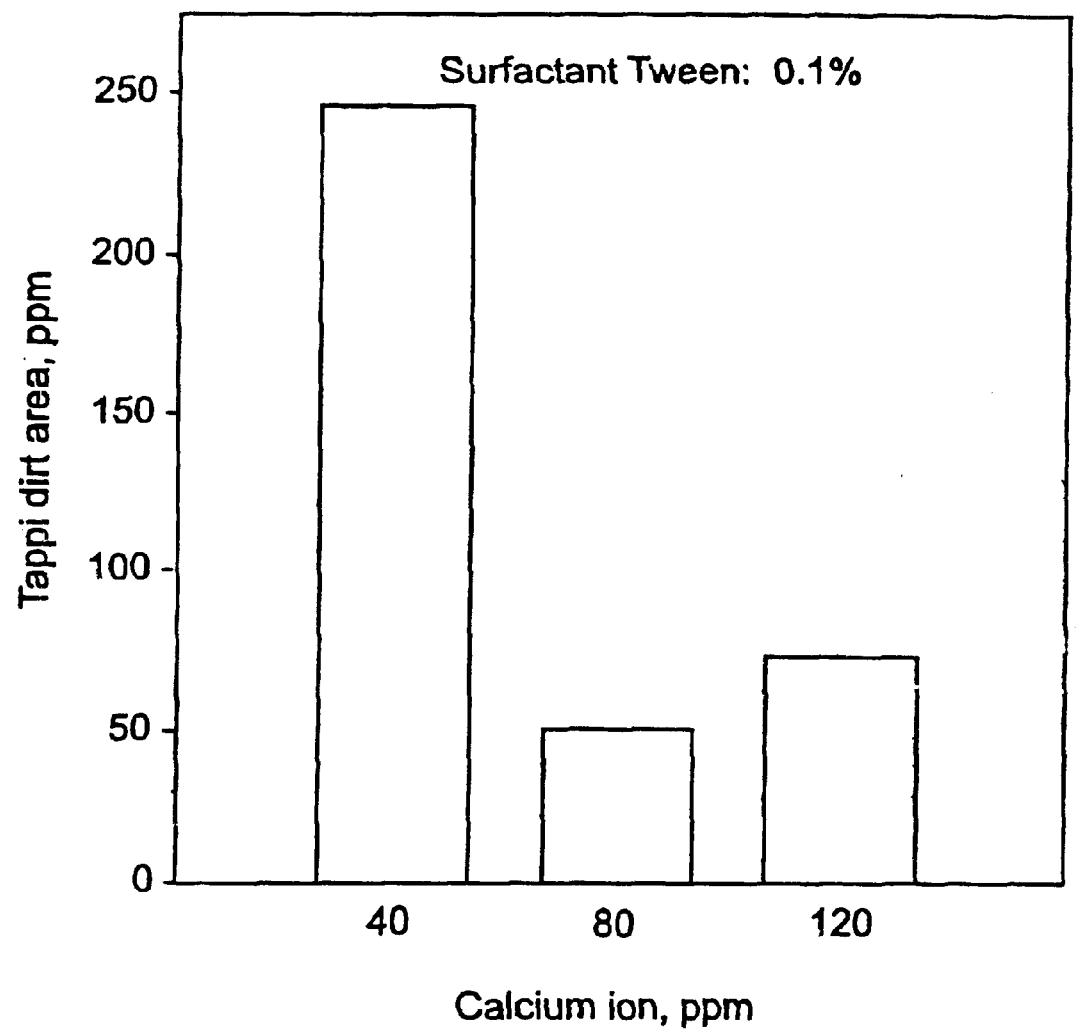
FIG. 10a illustrates the effect of acid cellulase NA on the residual ink area (dirt area fraction % [×1000]) and FIG. 10b illustrates the effect of acid cellulase on Tappi dirt counts.

The deinking enzymes are added in an amount sufficient to produce a deinked pulp Preferred enzyme concentrations range from about 0.01 to about 0.50 percent, and more preferably from about 0.04 to about 0.30 percent, based on the weight of oven-dried pulp. Enzyme concentrations around 0.05 percent are most preferred. Because of the inverse relationship between the β-glucosidase:FPU ratio and effective enzyme concentration, more efficient enzymes (characterized by ratios above 100:1) are effective at concentration levels approaching 0.04 percent; the most efficient enzymes are effective at concentration levels as low as 0.01 percent. Higher concentrations (up to 0.5%) are required when using enzymes with β-glucosidase:FPU ratios below 100:1. Surprisingly, as shown in FIGS. 8 and 10, higher enzyme concentrations do not necessarily produce cleaner recycled pulp. Also surprisingly, lower enzyme concentrations provide deinked pulp having superior appearance and physical properties, as measured by brightness (% ISO), tensile index (Nm/g), tear index (mNm2/g) and burst index (kPam2/g). (See Examples 4 and 6, Tables 5 and 6, and FIGS. 6a, 6b and 7.)

Following enzyme addition, pulping continues for a time sufficient to deink a substantial portion of toner particles. Deinking typically requires at least 10 minutes, more typically between about 20 and 30 minutes.

Enzyme deactivation can be accomplished by a variety of methods known in the art including, without limitation, one or a combination of the following steps: (1) adjusting the pH of the deinked pulp slurry to above 8, preferably between about 9 and 10; (2) heating the deinking pulp slurry to a temperature above about 70° C.; and/or (3) adding a chemical deactivator. Alkaline inactivation can be accomplished using conventional alkalinizing agents including, but not limited to, sodium hydroxide, potassium hydroxide, calcium hydroxide and sodium carbonate. As shown in Table 3, complete inactivation of fungal cellulase activity occurs within 40 minutes at pH 9. As will be appreciated by those skilled in the art, thermal denaturation depends upon the specific enzymes and generally occurs at temperatures above the optimum, as determined by the Arrhenius equation. As shown in Table 4, complete inactivation of cellulase activity occurs within 20 minutes at temperatures above 80° C. Chemical deactivation can be accomplished using hydrogen peroxide or conventional denaturing chemicals including, but not united to, ozone, chlorine, chlorine dioxide, hyperchloride, chloric acid, formamidine sulfinic acid (FAS), sodium thiosulfate, sodium sulfite, sodium hydrosulfate, potassium permanganate and other oxidants.

Flotation efficiency is significantly enhanced by introducing surfactant into the pulp slurry coincident with or, preferably, prior to enzyme addition. Surprisingly, this additive facilitates separation by flotation when maintained within an optimized concentration range. The surfactant concentration generally depends upon the particular surfactant, the specific enzyme composition, the type(s) of toner, the toner particle count, and the pulp consistency. The surfactant concentration typically ranges from about 0.05 to about 1.0 percent, preferably from about 0.1 to about 0.5 percent, and most preferably about 0.1. Surprisingly, as shown in FIG. 12, optimal deinking occurs at relatively low surfactant concentrations, as measured by Tappi dirt area. Above this optimum concentration, increasing surfactant concentration results in reduced separation efficiency and pulp yield. Although the effect of surfactant on flotation efficiency is exemplified using a nonionic surfactant, namely polyoxyethylenesorbitan (Tween 80), a wide variety of other surfactants (including anionic, cationic and amphoteric compounds) may also be used with good results. The choice of a particular surfactant is not critical to the invention. Any surfactant or combination of surfactants which facilitates dispersion of toner particles is suitable. Suitable surfactants are known to those skilled in the art and are readily available in commerce.

Figure 11:
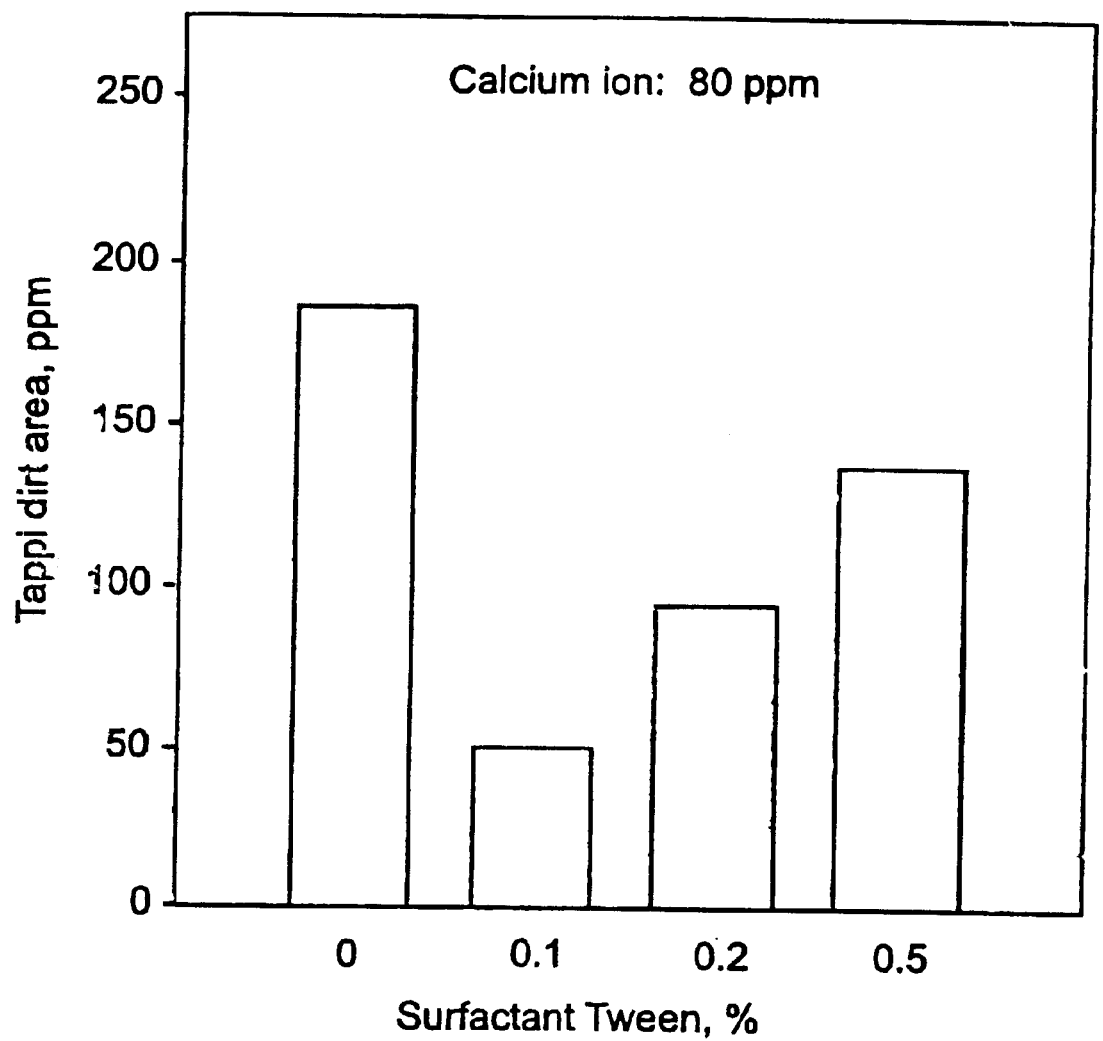
FIG. 11 illustrates the effect of calcium ion concentration on the Tappi dirt area of deinked pulps.

Flotation efficiency is further enhanced by adding an optimal amount of a monovalent or divalent cation into the pulp slurry concident with or, preferably, prior to enzyme addition. As shown in FIG. 11, an initial nominal increase in calcium ion concentration (40 ppm to 80 ppm) results in a significant increase in deinking efficiency. Surprisingly, however, increasing calcium beyond the optimal concentration results in reduced pulp cleanliness, as measured by the Tappi dirt area. Preferred divalent cation concentrations range from about 50 ppm to about 120 ppm, more preferably from about 60 ppm to about 100 ppm, and most preferably around 80 ppm. Although the effect of cation concentration on flotation efficiency is exemplified using calcium, other alkaline earth and alkali metals, used individually or in combination, may also be used with good results. Suitable cations include, but are not limited to, calcium, magnesium, manganese, sodium and lithium.

Optionally, it may be necessary or desirable to add a metal ion chelating agent to the pulp slurry to improve separation efficiency. Any chelating agent or combination of chelates capable of complexing heavy metal ions, thereby removing them from solution, is suitable. Suitable chelating agents include, but are not limited to, ethylenediaminetetraacetate (EDTA), diethylenetriamine-pentaacetic acid (DTPA), ethylene glycol-bis($\beta$-aminoethyl ether)N,N,N',N'-tetraacetic acid (EGTA) and their derivatives.

Separation of the toner particles from the pulp is accomplished by a variety of common methods including, without limitation, flotation, washing, cleaning and screening or a combination thereof.

Although the deinking method of the present invention is exemplified by adding surfactant and cation to the deinked pulp slurry, said supplements can be introduced at any step of the deinking process. For example, surfactant and cation, independently of one another, can be added prior to or during pH adjustment, enzyme addition or enzyme deactivation. Surfactant and cation are preferably added prior to or during enzyme addition.

The subject invention also provides a deinking composition containing enzymes as the active ingredient, wherein the enzymes are characterized by a ratio of $\beta$-glucosidase activity to FPU activity of at least about 30:1, preferably by a high ratio of $\beta$-glucosidase activity to FPU activity of at least about 100:1. As previously discussed, deinking enzymes of the invention promote desirable fiber surface modifications, reduce ink particle size, and alter the shape of released ink particles, thus providing clean, high quality deinked pulp. Preferred deinking formulations of the present invention also comprise optimum concentrations of cations and surfactant, thus providing significantly improved flotation efficiency. Compositions further comprising a metal ion chelating agent are of particular interest.

Another embodiment of this invention is to provide a simple and definitive assay for evaluating the efficiency of an enzyme preparation for deinking wastepaper. This method for selecting suitable deinking enzymes comprises the steps of determining the $\beta$-glucosidase activity and FPU activity of said enzymes and calculating the ratio of $\beta$-glucosidase activity to FPU activity. $\beta$-glucosidase activity can be measured as described in Example 2, or by methods known in the art (see, e.g., Wood, T. M., et al. (1988) "Measuring Cellulase Activities," Meth. Enzy. 160:109.) FPU activity can be measured as described in Example 2, or by methods known in the art (see, e.g., Wood et al., supra, p. 94). Enzymes having a high ratio of $\beta$-glucosidase activity to FPU activity have been found to provide surprisingly improved efficiency of deinking. Also surprisingly, an inverse relationship exists between the $\beta$-glucosidase:FPU ratio and the enzyme concentration required for effective deinking; the higher the ratio, the lower the required enzyme concentration. Enzymes with $\beta$-glucosidase:FPU ratios of at least 100:1 are preferred. However, enzymes with $\beta$-glucosidase:FPU ratios of less than 100:1 give satisfactory results when used at higher concentrations.

Figure 6A:
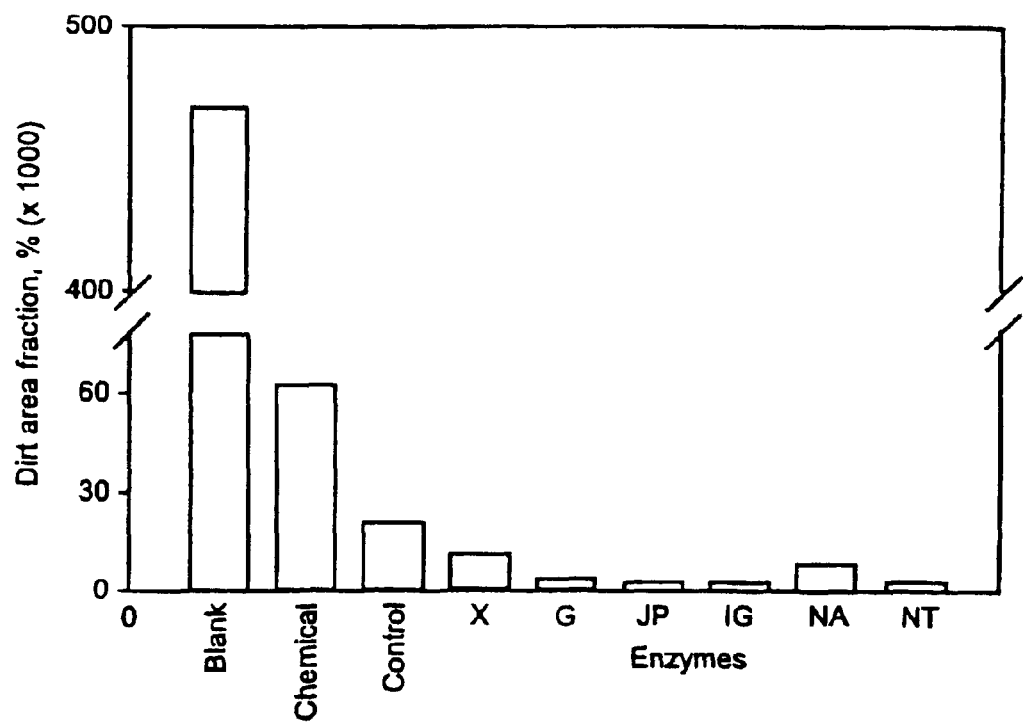
FIG. 6a illustrates the effects of different enzymes on residual ink particles as measured by dirt area fraction.
Figure 6B:
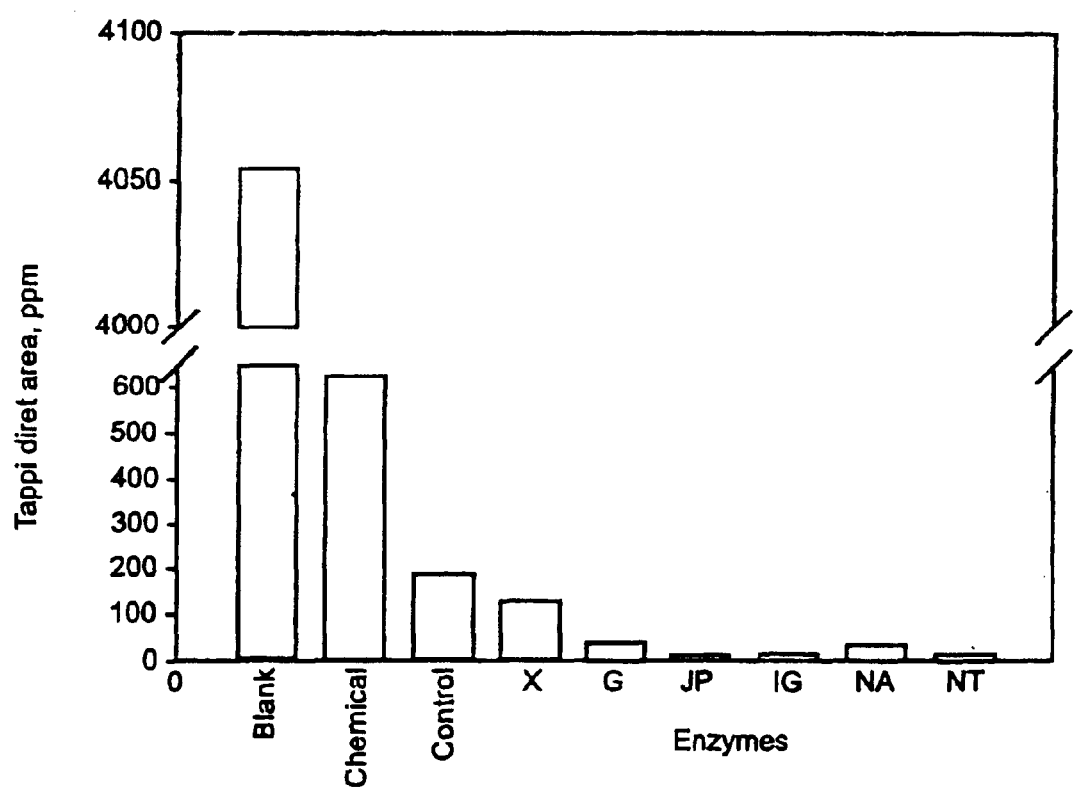
FIG. 6b illustrates the effects of enzymatic deinking on Tappi dirt area of pulps enzymatically deinked with each set of enzymes. In each of FIGS. 6a and 6b, comparison of enzymatically deinked pulps and blank, control and chemically deinked pulps are presented.

Several enzyme mixtures were analyzed and evaluated for efficiency of enzymatic deinking. Table 1 provides properties of each of these mixtures, namely protein content and specific enzyme activities (exo-glucanase, $\beta$-glucosidase, xylanase and total cellulase). Protein concentration was measured by the method of Lowry, O.H., et al. (1951) "Protein measurement with the Folin phenol reagent" J. Biol. Chem. 193:265–275, as described in Example 2. Cellulase and xylanase activities were calculated according to standard methods. As shown in FIG. 6, the choice of enzyme mixture has a significant effect on pulp cleanliness. As compared to chemical deinking, enzymatic treatment generally produces smaller, finer ink particles, thus providing surprisingly cleaner deinked pulp as measured by, for example, the Tappi dirt area. See FIGS. 6a, 6b, 7, 9a and 9b. Enzymatic deinking reduces the average toner particle size (average 20–40/Mn) and the number of particles larger than 100 $\mu$m.

Comparative studies were performed to test the effects of enzyme concentration on deinking. As exemplified using Enzymes IG and NA (FIGS. 7 and 9a and 9b, respectively), enzyme concentrations between about 0.02 and 0.10 percent, and particularly around 0.05 percent, result in the cleanest deinked pulp.

Those of ordinary skill in the art will understand that a number of parameters are important for optimal deinking. These parameters include, for example, the composition and characteristics of the paper furnish, the water quality, operating temperature, and pulping consistency, intensity and duration. It may be necessary to optimize these parameters for each particular recycling facility. Such optimization is routine in the art.

Those of ordinary skill in the art will appreciate that the cellulases and hemicellulases produced by lignocellulose-degrading microorganisms will vary from one organism to another and that the source(s) of the individual enzyme components may affect the efficiency of deinking. Although the best results are generally achieved using enzymes derived from the same organism or related organisms, a synergistic effect has been observed using cellulases from different fungal and bacterial groups. See K. -E. L. Eriksson et al. (1990) "Microbial and Enzymatic Degradation of Wood and Wood Components," p. 164–174, incorporated herein by reference. It may be necessary or desirable to optimize the enzyme composition when using cellulase components from different microbial sources, particularly when using fungal cellulases. Such optimization is routine employing the guidance provided herein, including the Examples.

It will also be apparent to those of ordinary skill in the art that alternative methods, reagents, procedures and techniques other than those specifically detailed herein can be employed or readily adapted to practice the deinking methods of this invention. Such alternative methods, reagents, procedures and techniques are within the spirit and scope of this invention.

The deinking methods and compositions of this invention are further illustrated in the following non-limiting Examples. All abbreviations used herein are standard abbreviations in the art, unless indicated otherwise. Specific procedures not described in detail in the Examples are well-known in the art.

EXAMPLES

Example 1

Materials and Equipment

Mixed office wastepaper comprising xerographic and laser-printed paper was collected and manually sorted to remove non-paper materials such as plastics and aluminum cans.

Enzylon C™ (referred to herein as "JP") is a cellulase from *Aspergillus niger* and was obtained from Rakuto Kasei Industrial Co., Ltd. (Tanakami Otsu City, Japan). Celluclast™ (Trichoderma acid cellulase), Novo Cellulase-Acid (Trichoderma acid cellulase, referred to herein as "NA") and Novo Cellulase-Neutral (bacterial cellulase referred to herein as "NT") were obtained from Novo Nordisk Bioindustrials, Inc. (Danbury, Conn.). Iogen Xylanase and Cellulase (Trichoderma-xylanase and cellulase, referred to herein as "X" and "IG," respectively) were obtained from Iogen Inc. (Ottawa, Ontario). Multifect™ CL (cellulase preparation from Trichoderma, referred to herein as "G") was obtained from Genencor International (Rochester, N.Y.).

Dinitrosalicylic acid reagent (DNS) was prepared as described in Miller, G. L., et al. (1960) Anal. Biochem. 1:127. Dinitrosalicyclic acid (40 g), phenol (8 g), sodium sulfite (2 g) and Rochelle salt (800 g) were dissolved in 2 liters of 2% (w/v) NaOH solution. The DNS solution was then diluted to 4 liters with distilled water.

All other enzymes and chemicals of the highest purity were purchased from Sigma Chemical Company (St. Louis, Mo.) or other commercial vendors.

Pulping and flotation were carried out in a 40-liter vessel equipped with a Helico pulping rotor and a classic rotor for flotation, both purchased from Fiberprep Inc. (Tounton, Mass.).

Example 2

Enzyme Analysis

Commercial cellulases were evaluated for protein content and specific enzyme activities, i.e., filter paper units, exoglucanase, β-glucosidase and xylanase activities. Table 1 presents the results of these analyses.

Protein concentration was measured as described in Lowry, O. H., et al. (1951 "Protein measurement with the Folin phenol reagent" J. Biol. Chem. 193:265–275. Briefly, a 2× Lowry concentrate was prepared by dissolving 20 g $Na_2CO_3$ in 260 ml water, 0.4 g $CuSO_4 \cdot 5H_2O$ in 20 ml water, and 0.2 g sodium potassium tartrate in 20 ml water; the solutions were then mixed to form a copper reagent. 3 parts copper reagent was mixed with 1 part 1.0% sodium dodecyl sulfate and 1 part 1 M NaOH. 400 µl enzyme aliquots were added to 400 µl of the 2× Lowry concentrate and incubated at room temperature for 10 minutes. 200 µl of 0.2 N Folin reagent was added and the solution immediately vortexed, then incubated for an additional 30 min. at room temperature. The absorbance was measured at 750 nm. The absorbance values were translated to g/L protein using a standard graph relating g/L protein to absorbance. Enzyme activities were determined in international units (IU). One IU is defined as the amount of enzymes required to release one micromole of reducing sugars or its equivalent per minute under defined conditions.

Exo-glucanase activity was measured using a modification of the exocellobiohydrolase assay described in Wood, T. M., et al. (1988) "Measuring Cellulase Activities," Meth. Enzy. 160:99. A 1% (w/v) suspension of Avicel was prepared by boiling commercial microcrystalline cellulose (Avicel) in distilled water for 10 minutes, drying at 105° C., grinding to a fine powder, and suspending the washed powder in distilled water. Multiple dilutions of each enzyme sample were prepared using acetate buffer; each dilution gave a final absorbance reading of between 0.2 and 1.0 at 575 nm. 0.4 ml 0.05 M Na-acetate (pH 5.0), 0.5 Avicel suspension and 0.1 ml enzyme solution were mixed in a test tube, incubated at 50° C. for 10 min. and centrifuged. 0.5 ml sample aliquots were mixed with 0.5 ml dinitrosalicylic acid reagent (DNS), the mixture boiled for 5 mm., then cooled to room temperature. The absorbance of the cooled samples was measured at 575 nm and the exo-glucanase activity calculated as described in Ghose, T. K. (1987) "Measurement of Cellulase Activities," Pure & Appl. Chem. 59(2):257–268.

β-glucosidase activity was measured using a modification of the β-glucosidase/cellobiase assay described in Wood, T. M., et al. (1988) Meth. Enzy. 160:109. This assay is based on the hydrolysis of p-nitrophenyl-β-glucopyranoside (PNGP) and the release of p-nitrophenol. Multiple dilutions of each enzyme sample were prepared using acetate buffer; final absorption reading (400 nm) for each dilution was between 0.2 and 1.0. 0.5 ml 0.05 M Na-acetate (pH 5.0), 0.4 ml 0.5% (w/v) PNGP and 0.1 ml enzyme solution were mixed in a test tube and incubated at 50° C. for 5 min. 1.0 ml 0.25 M $Na_2CO_3$ was added to stop the reaction and the mixture cooled to room temperature. The liberated p-nitrophenol was measured at 400 nm. The absorbance values were translated to micromoles of nitrophenol using a standard graph relating micromoles of nitrophenol to absorbance.

Xylanase activity was assayed by measuring reducing sugars released from birchwood xylan as described in Yang, J. L. and Eriksson, K. -E. L. (1992) "Use of Hemicellulolytic Enzymes as One Stage in Bleaching of Kraft Pulps," Holzforschung 46(6):481–488, incorporated herein by reference.

Filter paper units activity was measured using a modification of the total cellulase activity assay described in Wood, T. M., et al. (1988) Meth. Enzy. 160:94, incorporated herein by reference. Filter paper units activity (FPU) is a measurement of the composite activity of several enzymes that contribute to cellulase activity, i.e., β-glucosidase, endo- and exo-glucanases, and xylanases. Multiple dilutions of each enzyme sample were prepared using acetate buffer; final absorption reading (575 nm) for each dilution was between 0.2 and 1.0. 2.5 ml 0.05 M Na-acetate (pH 5.0) and 0.5 ml enzyme solution were mixed in a test tube of approximately 25-ml capacity and incubated 5 minutes at 50° C. A Whatman No. 1 filter paper strip (1×6 cm) was inserted into the test tube and maintained in solution. The samples were incubated for an additional 60 minutes with periodic mixing, then centrifuged. 1.0 ml aliquots were transferred to clean test tubes, mixed with 1.0 ml DNS, boiled for 5 minutes, then cooled to room temperature. The absorbance of the cooled samples was measured at 575 nm and the enzyme activity calculated as described in Wood et al., supra, p. 95–96.

TABLE 1

Commercial Enzyme Activities

| Enzyme | Protein (g/l) | FPU (U/ml) | Exo-glucanase (U/ml) | β-glucosidase (U/ml) | Xylanase (U/ml) | β-Glucosidase: FPU Ratio |
|---|---|---|---|---|---|---|
| X | 46 | — | — | — | 5,600 | N/A |
| G | 175 | 51 | 23 | 7,564 | 5,925 | 148 |
| JP | 218 | 106 | 49 | 42,258 | 3,837 | 398 |
| IG | 165 | 156 | 64 | 20,688 | 6,453 | 132 |
| NA | 136 | 95 | 36 | 3,923 | 1,515 | 41 |
| NT | 44 | 9 | 2 | 2,143 | 3,677 | 238 |

Example 3

Enzymatic Pulping of Xerographic and Laser-Printed Paper a. Fungal Cellulases; pH 5.0

2.5 kg oven-dried (o.d.) mixed office wastepaper comprising xerographic and laser-printed paper was slowly added to the 40-liter vessel containing 25 liters of water at 50° C. and at a mixing speed of 250 rpm. The mixing speed was then increased to 750 rpm, the pulping continued for 5 minutes at a pulp consistency of 10 percent, and the pH adjusted to about 5.0 using sulfuric acid. 1.25 g Enzyme IG was added to the pulp slurry to achieve a final enzyme concentration of 0.05 (w/w) percent. 2.50 g Tween 80 and 6.70 g calcium chloride were added to give final concentrations of 0.1 (w/w) percent and 80 ppm, respectively. Pulping was continued for an additional 30 minutes at 750 rpm, with pulp samples withdrawn at 10 minute intervals. FIG. 1 is a flow diagram of the enzymatic deinking and flotation process.

"Control" refers to pulp stock treated as described above except that the pH of the pulp suspension was not adjusted and chemicals were added in place of enzymes. Specifically, following the initial 5 minute pulping treatment, 25 g sodium hydroxide, 83 ml (30% w/w) hydrogen peroxide, 50 g sodium silicate and 12.5 g ethylenediamine-tetraacetate (EDTA) were added to give final concentrations of 1%, 1%, 0.02% and 0.5%, respectively. Pulping continued for 20 minutes at 50° C.

Figure 2:
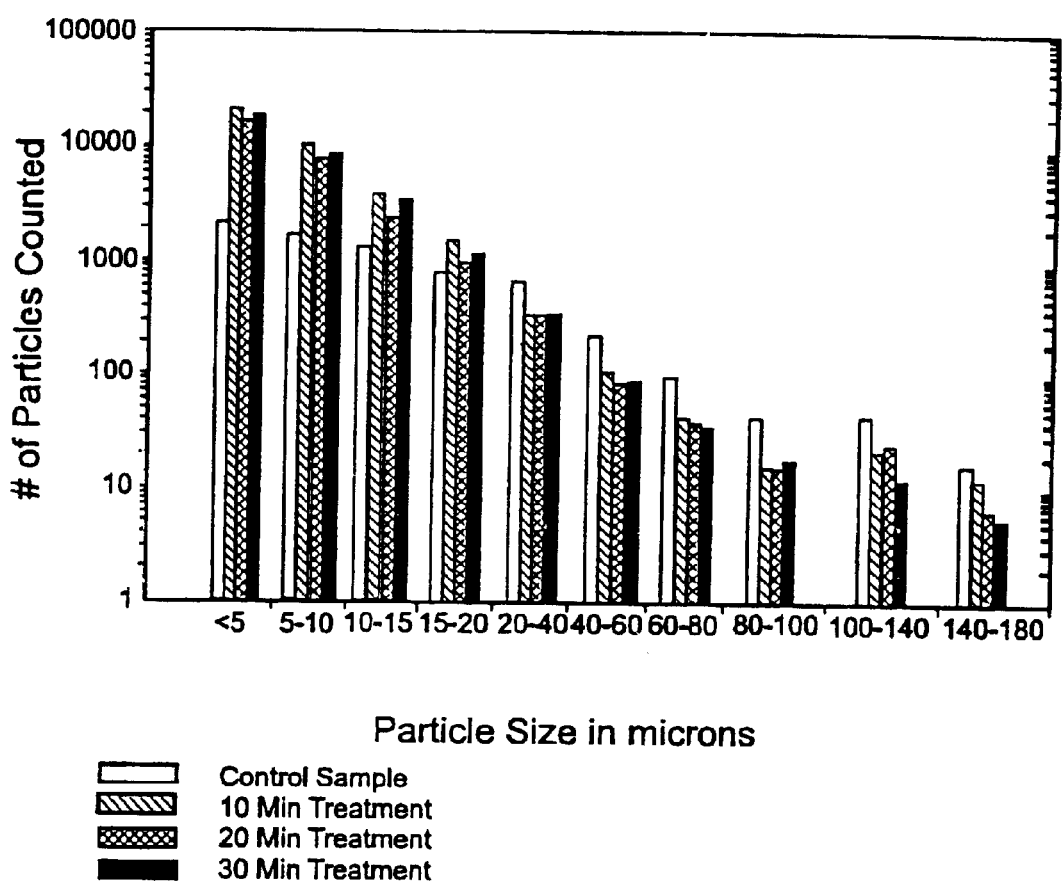
FIG. 2 illustrates the effect of enzymatic deinking (at pH 5.0) of mixed office waste papers on ink particle counts and distribution.
Figure 3:
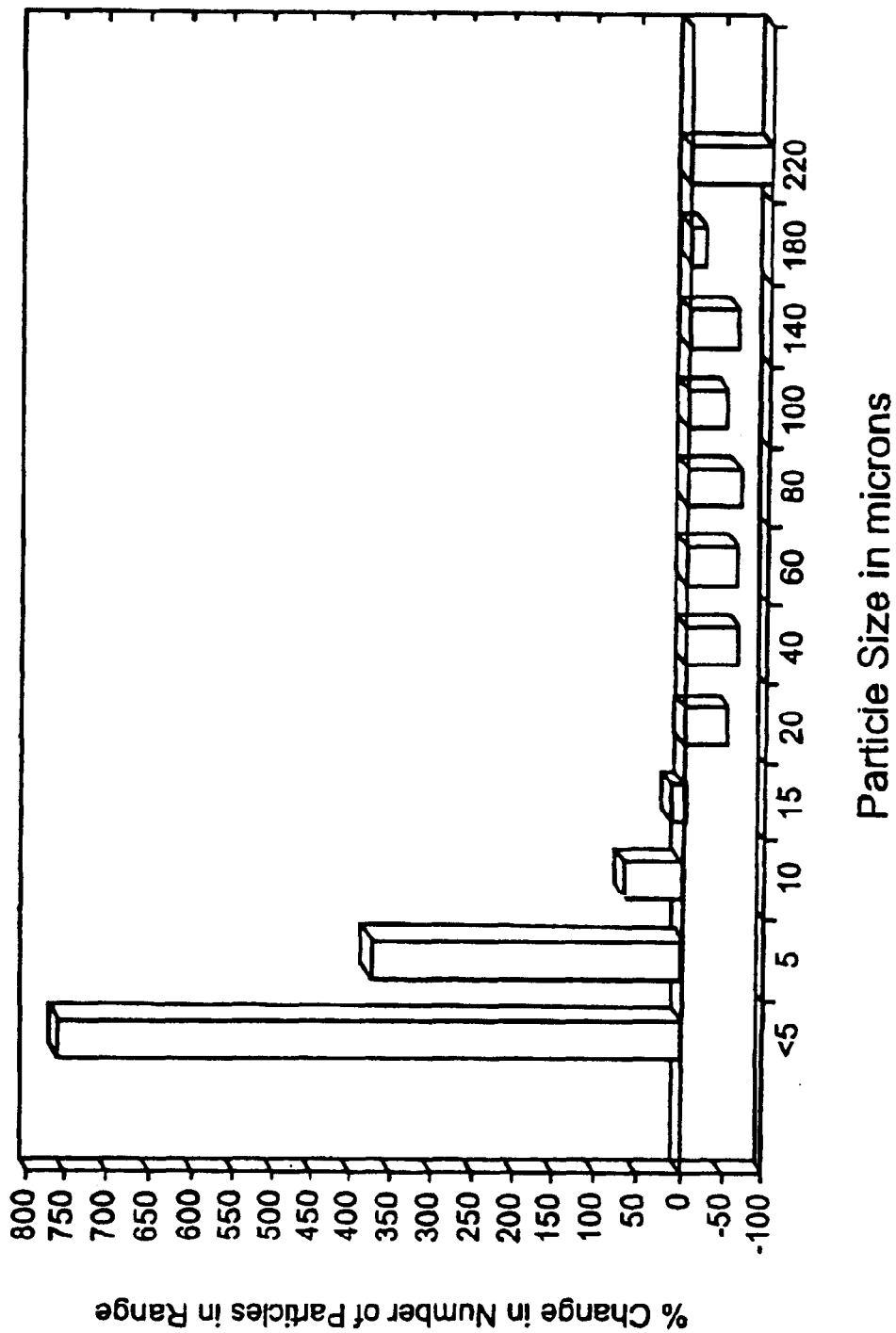
FIG. 3 illustrates the effect of enzymatic deinking (at pH 5.0) of mixed office waste papers on changes of ink particle count and distribution.

Ink particle analysis of the treated pulps was carried out by Kamyr Inc. (Glen Falls, N.Y.) using the image analyzer Optomax V 7.04 program. Results are shown in FIGS. 2 and 3. It can be seen that treatment with acidic cellulases has a significant effect on the ink particle size and ink size distribution.

b. Bacterial Cellulases; pH 7.0

2.5 kg oven-dried mixed office wastepaper comprising xerographic and laser-printed paper was slowly added to the 40-liter vessel containing 25 liters of water at 50° C. and at a mixing speed of 250 rpm. The mixing speed was then increased to 750 rpm, the pulping continued for 5 minutes at a pulp consistency of 10 percent, and the pH adjusted to about 7.0 using sulfuric acid. 2.50 g Enzyme NT was added to the pulp slurry to achieve a final enzyme concentration of 0.10 (w/w) percent. 2.50 g Tween 80 and 6.70 g calcium chloride were added to give final concentrations of 0.1 (w/w) percent and 80 ppm, respectively. Pulping continued for an additional 30 minutes at 750 rpm, with pulp samples withdrawn at 10 minute intervals.

Figure 4:
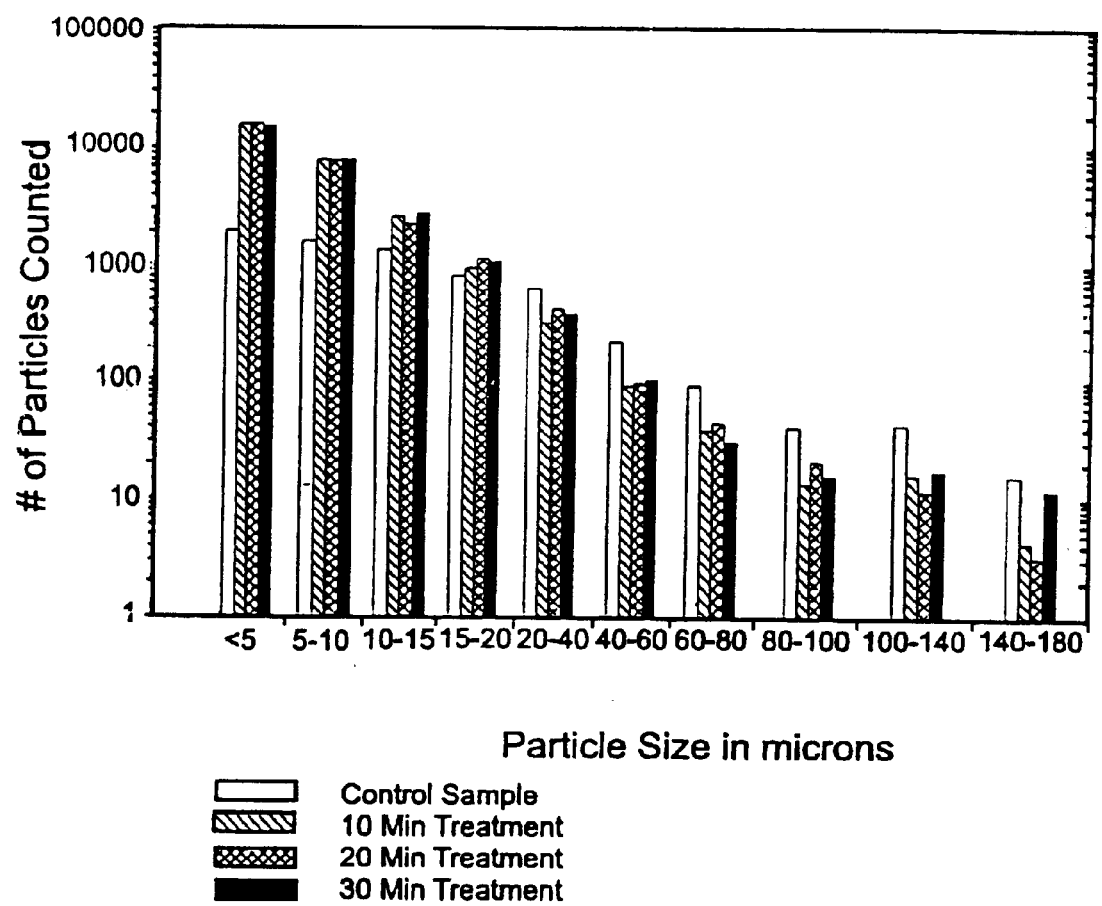
FIG. 4 illustrates the effect of enzymatic deinking (at pH 7.0) of mixed office waste papers on ink particle counts and distribution.
Figure 5:
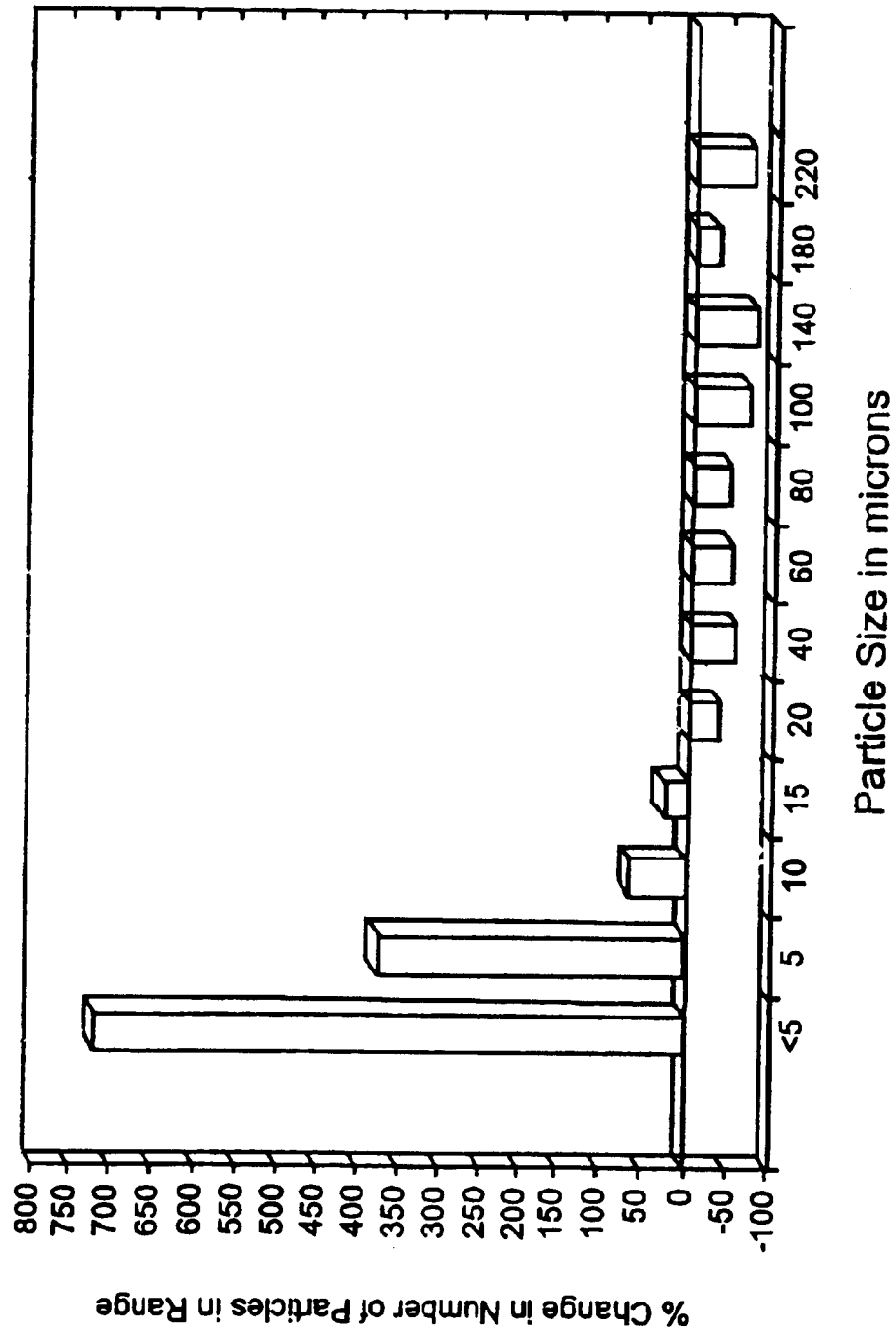
FIG. 5 illustrates the effect of enzymatic deinking (at pH 7.0) of mixed office waste papers on changes of ink particle count and distribution.

Ink particle analysis of the treated pulps was carried out by Kamyr Inc. (Glen Falls, N.Y.) using the Optomax V 7.04 program. Results are shown in FIGS. 4 and 5. "Control" refers to chemically treated pulp, as described above. It can be seen that treatment with neutral cellulases has a significant effect on the ink particle size and ink size distribution.

Example 4

Enzymatic Versus Chemical Deinking of Xerographic and Laser-Printed Paper 2.5 kg oven-dried mixed office wastepaper comprising xerographic and laser-printed paper was slowly added to the 40-liter vessel containing 25 liters of water at 50° C. and at a mixing speed of 250 rpm. The mixing speed was then increased to 750 rpm and pulping continued for 20 minutes at a pulp consistency of 10 percent. Pulp samples were dewatered by centrifugation and stored at 4° C. until use.

For enzymatic deinking, 350 g oven-dried pulp was pulped for 5 minutes at 50° C. with the Helico rotor at 750 rpm and a pulp consistency of 3 percent. The pH of the pulp suspension was adjusted to between about 4.8 and 5.3 using sulfuric acid and the mixing speed reduced to 250 rpm. The deinking enzymes were added at the concentrations indicated in Table 2: 0.25–1.25 g Tween 80 was added to give a final surfactant concentration of between about 0.1 and 0.5 percent, and 4.68–14.04 g calcium chloride was added to achieve a final calcium ion concentration of about 40–120 ppm. The pulping was continued for an additional 20 to 30 minutes.

Termination of enzyme activity was accomplished by raising the pH of the deinked pulp slurry to between about 9 and 10 with sodium hydroxide. Following enzyme deactivation, the Helico rotor was replaced with the classic flotation rotor. The toner particles were separated from the pulp by flotation at 50° C. for 10 minutes at 1 percent pulp consistency.

Conventional chemical deinking was performed as described above except that the pH of the pulp suspension was not adjusted and chemicals were added in place of enzymes. 350 g oven-dried pulp was pulped for 20 minutes at 50° C. with 1% sodium hydroxide, 1% hydrogen peroxide, 2% sodium silicate and 0.5% ethylenediamine-tetraacetate (EDTA); pH 9–11.

The deinked pulps were evaluated using standard Tappi methods and computer-assisted image analysis techniques. Pulp yield was calculated by determining the dry weight of accepted pulp (pulp after initial screening to remove sticks, stones and other debris) versus total paper furnishes. Image analysis was performed by Kamyr Inc. (Glen Falls, N.Y.) and Celleco Hedemora (Lawrenceville, Ga.) using the Optomax V 7.04 program. Dirt area fraction and Tappi dirt area were measured according to Tappi methods T437 and T246, respectively. Freeness (CSF), tensile index, tear index, burst index and brightness were measured according to Tappi methods T227, T220 and T414.

Results are shown in Table 2 and FIGS. 6a, 6b, 7a and 7b. In Table 2, "blank" refers to the starting pulp stock pulped with water only; "control" refers to starting pulp stock treated as described above, except that no enzymes or chemicals were added; and "chemical" refers to starting pulp stock deinked by the chemical deinking method described above. In all cases, recycled paper handsheets were prepared according to Tappi method T205.

As shown in FIGS. 6a and 6b, enzymatic deinking significantly improves pulp cleanliness, as measured by Tappi dirt area and dirt area fraction.

TABLE 2

Physical Properties of Deinked Pulps.

| Treatment | Enzyme Conc.[1] (%) | Freeness (ml) | Tensile Index (Nm/g) | Tear Index (mNm$^2$/g) | Burst Index (kPam$^2$/g) | Brightness (% ISO) |
|---|---|---|---|---|---|---|
| Blank | — | 575 | 28.4 | 10.0 | 1.4 | 85.5 |
| Control | — | 570 | 29.9 | 9.8 | 1.8 | 88.3 |
| Chemical | — | 515 | 33.4 | 8.8 | 1.9 | 89.1 |
| X | 0.10 | 595 | 33.6 | 10.2 | 1.6 | 89.5 |
| G | 0.05 | 585 | 32.6 | 11.4 | 1.5 | 89.3 |
|   | 0.10 | 600 | 31.8 | 9.8 | 1.8 | 89.5 |
| JP | 0.01 | 590 | 33.7 | 12.3 | 1.9 | 90.4 |
| IG | 0.05 | 585 | 31.3 | 10.2 | 1.5 | 89.7 |
|   | 0.10 | 600 | 30.8 | 10.1 | 1.7 | 89.5 |
| NA | 0.05 | 575 | 37.0 | 10.8 | 1.7 | 90.5 |
|   | 0.10 | 575 | 36.1 | 10.7 | 1.7 | 90.5 |
| NT | 0.10 | 625 | 34.6 | 12.2 | 1.8 | 90.2 |

[1]Enzyme concentrations (percentages) based on weight of enzymes/weight of oven-dried pulp.

As shown in Table 2, enzymatic deinking also affects the physical properties of the recycled pulp. At the enzyme concentrations used herein, enzymes JP, NT and IG were the most effective for ink removal and enzymes JP, NT and NA had the greatest effect on pulp physical properties.

FIGS. 7a and 7b show scanning electron micrographs of toner particles before and after treatment with enzymes (FIG. 7a and 7b, respectively). The toner particles released during enzymatic treatment are generally smaller in size and more sphere-like than toner particles before treatment with enzymes.

Example 5

Effect of pH, Temperature and Hydrogen Peroxide on Total Cellulase Activity a. pH The same procedures for enzymatic deinking were followed as in Example 4 above except that the pH of the deinked pulp slurry during the enzyme deactivation step varied from between 5 and 11 and the initial fungal cellulase concentration was 1.0% (w/w) oven-dried pulp. Residual enzyme activity was determined after 20, 40 and 60 minutes using the filter paper units activity assay described in Example 2. Results are shown in Table 3. As can be seen in Table 3, fungal cellulase activity terminates within approximately 20 minutes at pH levels above 9.

TABLE 3

Effect of pH on fungal cellulase activity

| | Relative FPU activity (%) | | |
|---|---|---|---|
| pH Levels | 20 min. | 40 min. | 60 min. |
| 5 | 95 | 83 | 64 |
| 6 | 88 | 74 | 55 |
| 7 | 56 | 38 | 25 |
| 8 | 20 | 15 | 0 |
| 9 | 8 | 0 | 0 |
| 10 | 0 | 0 | 0 |
| 11 | 0 | 0 | 0 | b. Temperature

The same procedures for exzymatic deinking were followed as in Example 4 above except that enzyme deactivation was accomplished using thermal denaturation and the initial cellulase concentration was 1.0% (w/w) oven-dried pulp. After 30 minutes of pulping, one-liter aliquots of deinked pulp slurry were transferred to shaking water baths preheated to the temperatures indicated in Table 4. The pulp slurries were incubated for 20 and 30 minutes, then assayed for filter paper units activity as described in Example 2. Results are shown in Table 4. As can be seen in Table 4, over 80% of cellulase activity terminates within approximately 20 minutes at temperatures above 70° C., and complete deactivation occurs within 20 minutes at temperatures above 80° C.

TABLE 4

Effect of temperature on cellulase activity

| | Relative activity (percent) | |
|---|---|---|
| Temperature (° C.) | 20 min. | 30 min. |
| 40 | 98 | 86 |
| 50 | 90 | 72 |
| 60 | 80 | 60 |
| 65 | 70 | 45 |
| 70 | 18 | 6 |
| 80 | 0 | 0 |
| 90 | 0 | 0 | c. Hydrogen Peroxide

The same procedures for enzymatic deinking were followed as in Example 4 above except that enzyme deactivation was accomplished using hydrogen peroxide and the initial cellulase concentration was 1.0% (w/w) oven-dried pulp. After 30 minutes of pulping, 0.60 ml (30% w/w) hydrogen peroxide solution was added for 350 g oven-dried pulp to the give a final concentration of 0.05 percent. Residual enzyme activity was determined using the filter paper units activity assay described in Example 2. Complete deactivation occurred within 10 minutes.

Example 6

Effect of Enzyme Concentration on Enzymatic Deinking a. Enzyme IG

The same procedures for enzymatic deinking were followed as in Example 4 above except that the initial enzyme concentration was varied from 0.02% to 1.0% (w/w) oven-dried pulp. The deinked pulps were evaluated using standard Tappi methods as described above. Results are shown in Table 5 and FIG. 8.

FIG. 8 shows that enzymatic deinking provides significantly cleaner recycled pulp than chemical deinking, particularly at enzyme concentrations of between about 0.02–0.50 percent.

Table 5 shows the effect of Enzyme IG concentration on pulp freeness and physical properties. Water drainage (measured by CSF) improves with increasing enzyme concentrations, reaching a maximum at an enzyme concentration of 0.5%. As shown in Table 5, optimal pulp physical properties are observed with enzyme concentrations below 0.2%; pulp strength declines at Enzyme IG concentrations above 0.5%.

FIG. 9 shows the effect of Enzyme IG concentration on pulp hydrolysis as measured by pulp weight loss. It can be seen that fiber weight loss increases with increasing enzyme concentrations.

TABLE 5

Effect of Enzyme IG Concentration on Pulp Physical Properties

| Treatment | Freeness (ml) | Grammage (g/m$^2$) | Tensile Index (Nm/g) | Tear Index (mNm$^2$/g) | Burst Index (kPam$^2$/g) | Brightness (% ISO) |
|---|---|---|---|---|---|---|
| Blank | 575 | 57.7 | 28.4 | 10.0 | 1.8 | 85.5 |
| Control | 570 | 59.6 | 29.9 | 9.8 | 2.0 | 88.3 |
| Chemical | 515 | 60.7 | 33.4 | 8.8 | 2.1 | 89.1 |
| 0.02% IG | 558 | 60.2 | 32.8 | 10.4 | 2.1 | 89.7 |
| 0.05% IG | 590 | 60.3 | 31.3 | 10.2 | 2.1 | 89.6 |
| 0.10% IG | 600 | 61.7 | 30.8 | 10.1 | 2.2 | 89.6 |
| 0.20% IG | 610 | 61.9 | 31.1 | 9.1 | 2.2 | 89.5 |
| 0.50% IG | 625 | 59.8 | 30.4 | 7.2 | 1.8 | 89.4 |
| 1.0% IG | 620 | 60.2 | 29.4 | 6.2 | 1.7 | 88.0 | b. Enzyme NA

The concentration of Enzyme NA was varied from 0.02% to 1.0% (w/w) oven-dried pulp, as described above for Enzyme IG. The deinked pulps were evaluated using standard Tappi methods. Results are shown in Table 6 and FIGS. 10a and 10b.

FIGS. 10a and 10b show that enzymatic deinking provides significantly cleaner recycled pulp than chemical deinking, particularly at Enzyme NA concentrations of between about 0.02 and 0.25 percent.

Table 6 shows the effect of Enzyme NA concentration on pulp freeness and physical properties. As with Enzyme IG, water drainage (measured by CSF) improves with increasing Enzyme NA concentrations. Optimal pulp physical properties are observed with Enzyme NA concentrations between about 0.02 and 0.20%; pulp strength declines at enzyme concentrations above 0.2%.

TABLE 6

Effect of Enzyme NA Concentration on Pulp Physical Properties

| Treatment | Freeness (ml) | Grammage (g/m$^2$) | Tensile Index (Nm/g) | Tear Index (mNm$^2$/g) | Burst Index (kPam$^2$/g) | Brightness (% ISO) |
|---|---|---|---|---|---|---|
| Blank | 575 | 57.7 | 28.4 | 10.0 | 1.8 | 85.5 |
| Control | 570 | 59.6 | 29.9 | 9.8 | 2.0 | 88.3 |
| Chemical | 515 | 60.7 | 33.4 | 8.8 | 2.1 | 89.1 |
| 0.05% NA | 570 | 60.0 | 37.0 | 10.8 | 1.7 | 90.5 |
| 0.10% NA | 575 | 60.3 | 36.1 | 10.7 | 1.8 | 90.5 |
| 0.20% NA | 625 | 59.5 | 33.3 | 10.2 | 1.7 | 90.5 |
| 0.50% NA | 645 | 60.5 | 32.6 | 9.6 | 1.4 | 89.6 |

Example 7

Effect of Calcium Ion Concentration on Flotation Efficiency

The same procedures for enzymatic deinking were followed as in Example 4 above except that the surfactant (Tween 80) concentration was 0.1 and the calcium ion concentration was varied from 40 to 120 ppm. The deinked pulps were evaluated using Tappi method T246. Results are shown in FIG. 11. Optimal results were achieved at 80 ppm calcium ion concentration with surfactant Tween 80 0.1% (w/w).

Example 8

Effect of Surfactant Concentration on Flotation Efficiency

The same procedures for enzymatic deinking were followed as in Example 4 above except that the surfactant (Tween 80) concentration was varied from 0 to 0.5 percent. The deinked pulps were evaluated using Tappi method T246. Results are shown in FIG. 12. Optimal results were achieved at 0.1% (w/w) of surfactant Tween 80 with 80 ppm of calcium ion concentration.

We claim:

1. A composition for deinking toner from from noncontact printed wastepaper and mixtures of noncontact and contact printed wastepaper, said composition comprising deinking enzymes as active ingredients, wherein said deinking enzymes have a β-glucosidase activity to filter paper units activity ratio of at least 30:1, wherein said β-glucosidase and filter paper units activities are measured in international units per ml, and wherein said deinking enzymes comprise exo-glucanase, β-glucosidase, xylanase and filter paper units activities.

2. The composition of claim 1 wherein said deinking enzymes have a β-glucosidase activity to filter paper units activity ratio of at least 100:1.

3. The composition of claim 1 wherein said deinking enzymes are microbial cellulases.

4. The composition of claim 1, wherein said microbial cellulases are derived from strains of the same species.

5. The composition of claim 3 wherein said microbial cellulases are derived from a strain of Aspergillus or Trichoderma.

6. The composition of claim 1 wherein the composition further comprises a surfactant, a cation and a slurry comprising noncontact printed wastepaper or wastepaper comprising noncontact printed paper and contact printed paper, wherein the pulp slurry has a concentration of from about 5 percent to about 15 percent, on a weight dry pulp/weight pulp suspension basis, wherein the concentration of said deinking enzymes is about 0.01 percent to about 0.50 percent, wherein said percentages are on a weight of enzymes/weight dry pulp basis and wherein the concentration of said surfactant is from about 0.02 percent to about 1.50 percent, wherein said percent is on a weight of surfactant/weight dry pulp basis to the pulp slurry, and wherein said cation is selected from the group consisting of calcium, magnesium, manganese, sodium and lithium at a concentration of from about 20 ppm to about 800 ppm in said composition.

7. The composition of claim 6 wherein the concentration of said deinking enzymes is about 0.04 percent to about 0.30 percent.

8. The composition of claim 6 wherein the concentration of said deinking enzymes is about 0.05 percent.

9. The composition of claim 6 wherein said surfactant is an anionic surfactant.

10. The composition of claim 6 wherein said surfactant is polyoxyethylenesorbitan monooleate (Tween 80).

11. The composition of claim 6 wherein said cation is calcium.

12. The composition of claim 6 wherein said cation is added at a concentration of about 80 ppm.

13. The composition of claim 6 further comprising a chelating agent.

14. The composition of claim 13 wherein said chelating agent is ethylenediaminetetraacetic acid (EDTA) or diethylenetriaminepentaacetic acid (DTPA).

* * * * *

UNITED STATES PATENT AND TRADEMARK OFFICE
CERTIFICATE OF CORRECTION

PATENT NO. : 6,767,728 B2
DATED : July 27, 2004
INVENTOR(S) : Yang et al.

It is certified that error appears in the above-identified patent and that said Letters Patent is hereby corrected as shown below:

Column 1,
Lines 8 and 9, delete "08/308,666 filed Sept. 19, 1994, now U.S. Pat No. 5,454,389." and replace with -- 08/308,666 filed Sep. 15, 1994, now abandoned. --.

Column 5,
Lines 33-38, delete.
Line 39, delete "FIG. 8" and replace with -- FIG. 7 --.
Line 42, delete "FIG. 9" and replace with -- FIG. 8 --.
Line 45, delete "FIG. 10a" and replace with -- FIG. 9a --.
Line 46, delete "FIG. 10b" and replace with -- FIG. 9b --.
Line 48, delete "FIG. 11" and replace with -- FIG. 10 --.
Line 51, delete "FIG. 12" and replace with -- FIG. 11 --.

Column 8,
Line 49, delete "hyperchloride" and replace with -- hypochlorite --.
Line 63, delete "FIG. 12," and replace with -- FIG. 11, --.

Column 9,
Line 12, delete "concident" and replace with -- coincident --.
Line 13, delete "FIG. 11," and replace with --FIG. 10, --.

Column 10,
Line 33, delete "20-40/Mn)" and replace with -- 20-40 $\mu$m) --.

Column 15,
Line 5, delete "6a, 6b, 7a and 7b" and replace with -- 6a and 6b --.
Lines 45-47, delete "FIGS. 7a and 7b show scanning electron micrographs of toner particles before and after treatment with enzymes (FIG. 7a and 7b, respectively). The" and replace with -- Electron microscopy showed that --.

Figure 7:
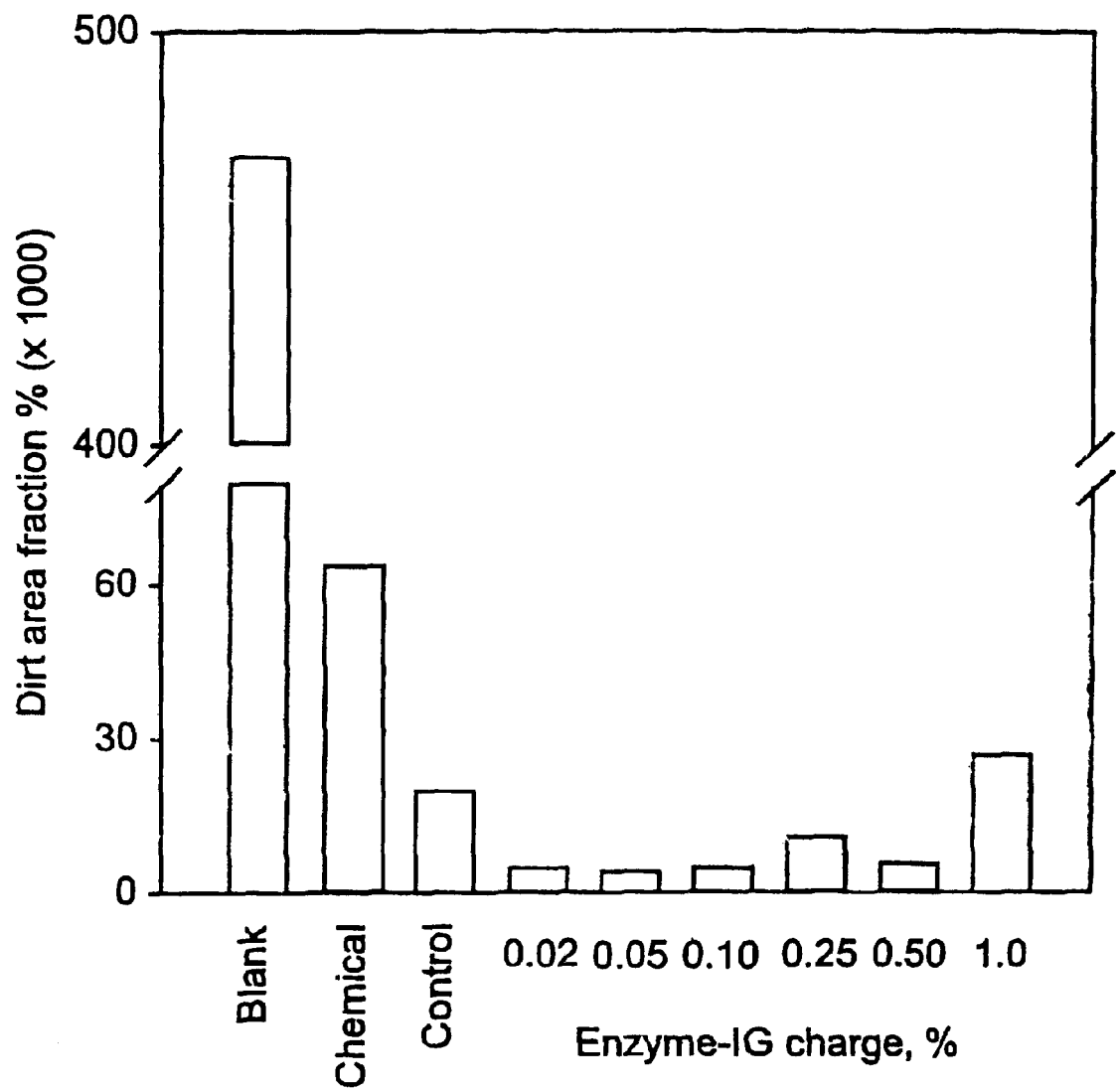
FIGS. 7a and 7b are scanning micrographs of ink particles before and after the enzyme treatment followed by flotation.
Figure 8:
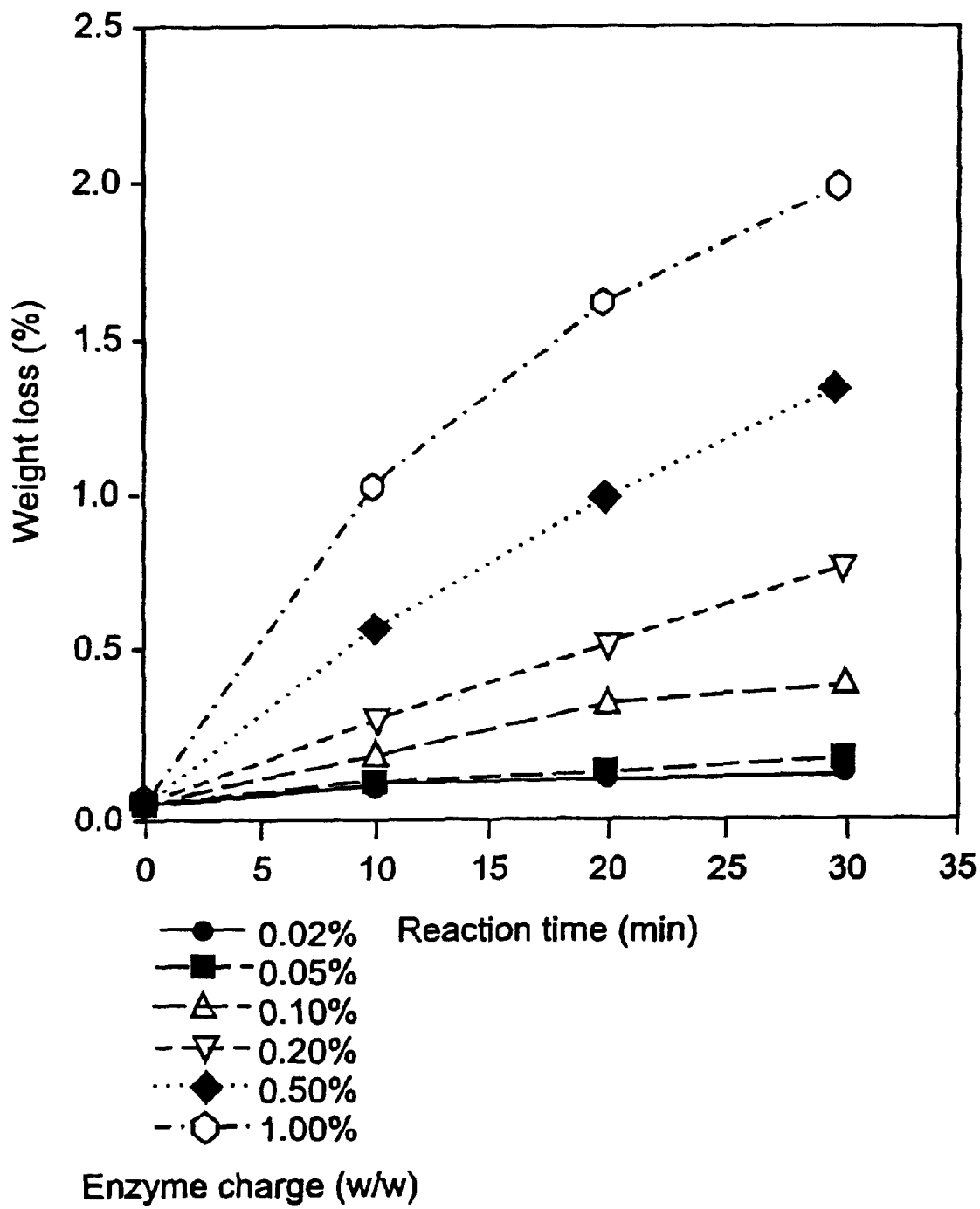
FIG. 8 illustrates the effect of enzyme IG on the residual ink area counts at different enzyme concentrations as compared with blank and chemically deinked controls.
Figure 9A:
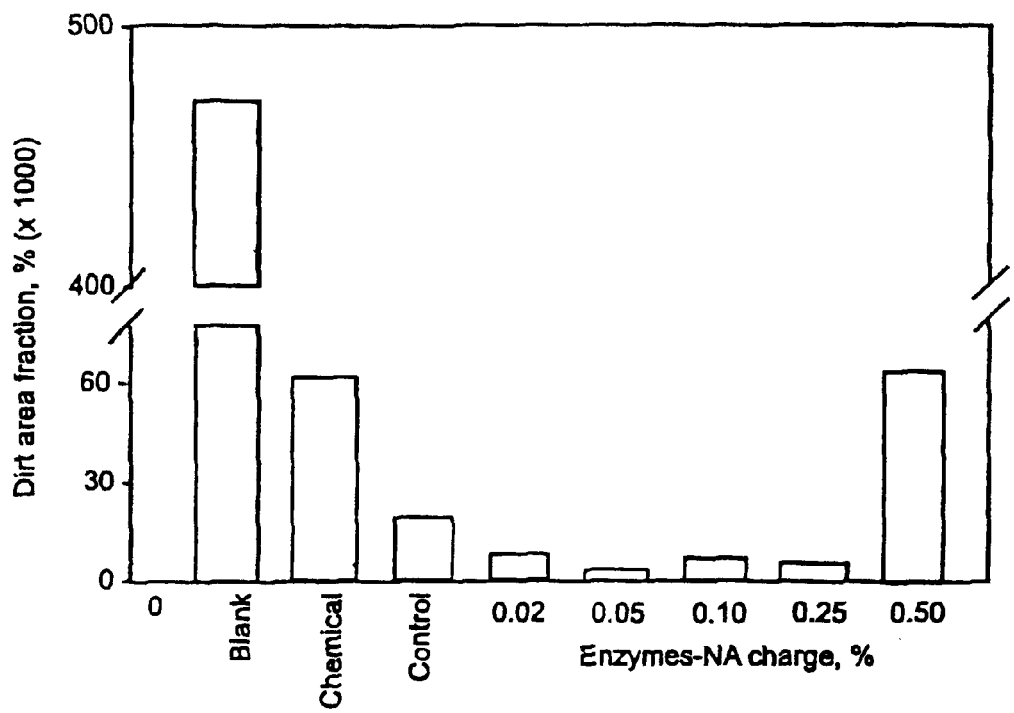
FIG. 9 illustrates pulp weight loss vs. treatment time at enzyme concentrations from 0.02% to 1.0% wherein said percentage is on a weight of enzymes/weight dry pulp basis.
Figure 9B:
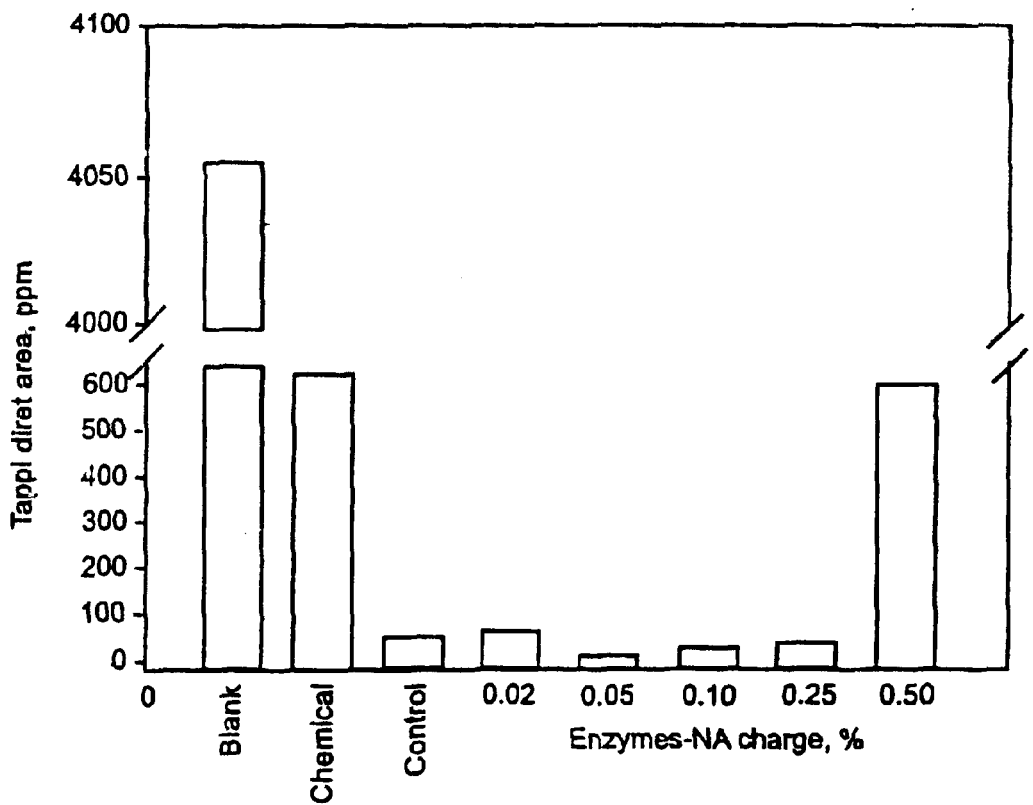

Column 16,
Line 67, delete "FIG. 8" and replace with -- FIG. 7 --.

Column 17,
Line 1, delete "FIG. 8" and replace with -- FIG. 7 --.
Line 12, delete "FIG. 9" and replace with -- FIG. 8 --.
Line 36, delete "10a and 10b." and replace with -- 9a and 9b. --.
Line 37, delete "FIGS. 10a and 10b." and replace with --FIGS. 9a and 9b.--

UNITED STATES PATENT AND TRADEMARK OFFICE
CERTIFICATE OF CORRECTION

PATENT NO. : 6,767,728 B2
DATED : July 27, 2004
INVENTOR(S) : Yang et al.

It is certified that error appears in the above-identified patent and that said Letters Patent is hereby corrected as shown below:

Column 18,
Line 1, delete "0.1" and replace with -- 0.1% --.
Line 4, delete "FIG. 11" and replace with -- FIG. 10 --.
Line 16, delete "FIG. 12" and replace with -- FIG. 11 --.

Signed and Sealed this

Twenty-first Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,767,728 B2
APPLICATION NO. : 10/012926
DATED : July 27, 2004
INVENTOR(S) : Yang et al.

It is certified that error appears in the above-identified patent and that said Letters Patent is hereby corrected as shown below:

Title Page,
Item [62] Related U.S. Application Data, Lines 4 and 5, delete "08/308,666 filed Sept. 19, 1994, now U.S. Pat No. 5,454,389." and replace with --08/306,666 filed Sept. 15, 1994, now abandoned.--

Signed and Sealed this

Nineteenth Day of February, 2008

JON W. DUDAS
*Director of the United States Patent and Trademark Office*